(12) United States Patent
Gonzales, Jr.

(10) Patent No.: US 10,896,418 B2
(45) Date of Patent: Jan. 19, 2021

(54) SECURE MANAGEMENT OF DATA FILES USING A BLOCKCHAIN

(71) Applicant: eBay, Inc., San Jose, CA (US)

(72) Inventor: Sergio Pinzon Gonzales, Jr., San Jose, CA (US)

(73) Assignee: EBAY INC., San Jose, CA (US)

( * ) Notice: Subject to any disclaimer, the term of this patent is extended or adjusted under 35 U.S.C. 154(b) by 170 days.

(21) Appl. No.: 16/020,969

(22) Filed: Jun. 27, 2018

(65) Prior Publication Data

US 2019/0205558 A1  Jul. 4, 2019

Related U.S. Application Data

(60) Provisional application No. 62/612,091, filed on Dec. 29, 2017.

(51) Int. Cl.
*H04L 29/06* (2006.01)
*G06Q 20/38* (2012.01)
(Continued)

(52) U.S. Cl.
CPC ....... *G06Q 20/389* (2013.01); *G06F 16/1805* (2019.01); *G06F 16/27* (2019.01);
(Continued)

(58) Field of Classification Search
CPC .. G06Q 20/389; G06Q 40/08; G06Q 20/0855; G06Q 20/401; G06Q 20/3829;
(Continued)

(56) References Cited

U.S. PATENT DOCUMENTS

| 5,557,088 A | 9/1996 | Shimizu et al. |
| 5,607,350 A | 3/1997 | Levasseur et al. |

(Continued)

FOREIGN PATENT DOCUMENTS

| CN | 106130738 A | 11/2016 |
| CN | 106777923 A | 5/2017 |

(Continued)

OTHER PUBLICATIONS

Chronologic, "Temporal Innovation on the Blockchain", Retrieved from the Internet URL: <https://chronologic.network/uploads/Chronologic_Whitepaper.pdf>, Oct. 11, 2018, 25 pages.

(Continued)

*Primary Examiner* — John B King
(74) *Attorney, Agent, or Firm* — Shook, Hardy & Bacon L.L.P.

(57) ABSTRACT

Technologies are shown for secure management of a data file secured on a data file management blockchain that involve generating a genesis block for a data file management blockchain that contains a data file to be managed and signing the genesis block to commit the genesis block to the data file management blockchain. One or more transaction data blocks are generated for the data file management blockchain that each include a modification to the data file and the blocks are signed to commit them to the blockchain. In some examples, the modifications describe changes to the data file and the transaction data blocks are traced to the genesis block and a current data file generated by applying the modifications on the transaction data blocks to the data file in a sequence determined by an order of the one or more transaction data blocks in the data file management blockchain.

17 Claims, 16 Drawing Sheets

(51) Int. Cl.

| | | |
|---|---|---|
| *H04L 9/32* | (2006.01) | |
| *G06F 21/62* | (2013.01) | |
| *G06F 21/10* | (2013.01) | |
| *G06Q 20/08* | (2012.01) | |
| *G06Q 40/08* | (2012.01) | |
| *G06F 16/27* | (2019.01) | |
| *G06F 16/18* | (2019.01) | |
| *G06F 21/30* | (2013.01) | |
| *H04L 9/06* | (2006.01) | |
| *G06Q 20/42* | (2012.01) | |
| *G06Q 30/00* | (2012.01) | |
| *G06F 21/60* | (2013.01) | |
| *G06Q 20/40* | (2012.01) | |
| *H04L 9/30* | (2006.01) | |
| *H04L 29/08* | (2006.01) | |
| *G06F 21/64* | (2013.01) | |

(52) U.S. Cl.
CPC .............. *G06F 21/10* (2013.01); *G06F 21/30* (2013.01); *G06F 21/602* (2013.01); *G06F 21/62* (2013.01); *G06F 21/6218* (2013.01); *G06F 21/6245* (2013.01); *G06Q 20/0855* (2013.01); *G06Q 20/3825* (2013.01); *G06Q 20/3829* (2013.01); *G06Q 20/401* (2013.01); *G06Q 20/42* (2013.01); *G06Q 30/018* (2013.01); *G06Q 40/08* (2013.01); *H04L 9/0637* (2013.01); *H04L 9/0643* (2013.01); *H04L 9/30* (2013.01); *H04L 9/3236* (2013.01); *H04L 9/3239* (2013.01); *H04L 9/3247* (2013.01); *H04L 9/3297* (2013.01); *H04L 63/102* (2013.01); *H04L 63/12* (2013.01); *H04L 65/4084* (2013.01); *H04L 67/20* (2013.01); *H04L 67/327* (2013.01); *G06F 21/645* (2013.01); *G06F 2221/2107* (2013.01); *H04L 67/18* (2013.01); *H04L 2209/38* (2013.01); *H04L 2209/56* (2013.01)

(58) Field of Classification Search
CPC .. G06Q 20/3825; G06Q 30/018; G06Q 20/42; G06F 21/6218; G06F 21/30; G06F 16/1805; G06F 16/27; G06F 21/645; G06F 2221/2107; G06F 21/10; G06F 21/62; G06F 21/602; G06F 21/6245; H04L 2209/56; H04L 67/18; H04L 2209/38; H04L 9/3297; H04L 9/3239; H04L 67/327; H04L 67/20; H04L 65/4084; H04L 63/12; H04L 63/102; H04L 9/30; H04L 9/3236; H04L 9/0637; H04L 9/3247; H04L 9/0643
See application file for complete search history.

(56) References Cited

U.S. PATENT DOCUMENTS

| | | | |
|---|---|---|---|
| 7,627,531 | B2 | 12/2009 | Breck et al. |
| 7,656,271 | B2 | 2/2010 | Ehrman et al. |
| 9,635,000 | B1 | 4/2017 | Muftic |
| 9,641,342 | B2 | 5/2017 | Sriram et al. |
| 9,680,799 | B2 | 6/2017 | Iyer et al. |
| 9,722,790 | B2 | 8/2017 | Ebrahimi |
| 9,749,140 | B2 | 8/2017 | Oberhauser et al. |
| 9,749,297 | B2 | 8/2017 | Gvili |
| 9,774,578 | B1 | 9/2017 | Ateniese et al. |
| 9,794,074 | B2 | 10/2017 | Toll et al. |
| 10,715,323 | B2 | 7/2020 | Chan et al. |
| 2004/0024688 | A1 | 2/2004 | Bi et al. |
| 2006/0100965 | A1 | 5/2006 | Simelius |
| 2013/0174272 | A1 | 7/2013 | Chevalier et al. |
| 2013/0219458 | A1 | 8/2013 | Ramanathan |
| 2015/0302400 | A1 | 10/2015 | Metral |
| 2015/0332283 | A1 | 11/2015 | Witchey |
| 2016/0028552 | A1 | 1/2016 | Spans et al. |
| 2016/0191243 | A1 | 6/2016 | Manning |
| 2016/0203572 | A1 | 7/2016 | Mcconaghy et al. |
| 2016/0284033 | A1 | 9/2016 | Winand et al. |
| 2016/0300234 | A1 | 10/2016 | Moss-pultz et al. |
| 2016/0321752 | A1 | 11/2016 | Tabacco et al. |
| 2016/0330034 | A1 | 11/2016 | Back et al. |
| 2016/0335533 | A1 | 11/2016 | Davis et al. |
| 2016/0342976 | A1 | 11/2016 | Davis |
| 2016/0342977 | A1 | 11/2016 | Lam |
| 2016/0358184 | A1 | 12/2016 | Radocchia et al. |
| 2016/0379212 | A1 | 12/2016 | Bowman et al. |
| 2017/0005804 | A1 | 1/2017 | Zinder |
| 2017/0011460 | A1 | 1/2017 | Molinari et al. |
| 2017/0046526 | A1 | 2/2017 | Chan et al. |
| 2017/0046651 | A1 | 2/2017 | Lin et al. |
| 2017/0046664 | A1 | 2/2017 | Haldenby et al. |
| 2017/0048209 | A1 | 2/2017 | Lohe et al. |
| 2017/0103385 | A1 | 4/2017 | Wilson et al. |
| 2017/0103390 | A1 | 4/2017 | Wilson, Jr. et al. |
| 2017/0109735 | A1 | 4/2017 | Sheng et al. |
| 2017/0116693 | A1 | 4/2017 | Rae et al. |
| 2017/0132630 | A1 | 5/2017 | Castinado et al. |
| 2017/0149560 | A1 | 5/2017 | Shah |
| 2017/0177898 | A1 | 6/2017 | Dillenberger |
| 2017/0232300 | A1 | 8/2017 | Tran et al. |
| 2017/0236102 | A1 | 8/2017 | Biton |
| 2017/0236103 | A1 | 8/2017 | Biton |
| 2017/0236104 | A1 | 8/2017 | Biton |
| 2017/0237570 | A1 | 8/2017 | Vandervort |
| 2017/0243193 | A1 | 8/2017 | Manian et al. |
| 2017/0250796 | A1 | 8/2017 | Samid |
| 2017/0300627 | A1* | 10/2017 | Giordano ............... G16H 10/60 |
| 2017/0300928 | A1 | 10/2017 | Radocchia et al. |
| 2017/0302663 | A1 | 10/2017 | Nainar et al. |
| 2017/0308872 | A1 | 10/2017 | Uhr et al. |
| 2017/0317997 | A1 | 11/2017 | Smith et al. |
| 2017/0329980 | A1 | 11/2017 | Hu et al. |
| 2017/0331810 | A1 | 11/2017 | Kurian |
| 2017/0337534 | A1 | 11/2017 | Goeringer et al. |
| 2017/0366353 | A1 | 12/2017 | Struttmann |
| 2018/0018723 | A1 | 1/2018 | Nagla et al. |
| 2018/0025442 | A1 | 1/2018 | Isaacson et al. |
| 2018/0173719 | A1* | 6/2018 | Bastide ................... G06F 21/64 |
| 2018/0181730 | A1 | 6/2018 | Lyske |
| 2018/0257306 | A1* | 9/2018 | Mattingly ............. B29C 64/386 |
| 2018/0294957 | A1* | 10/2018 | O'Brien ................ G06F 21/105 |
| 2018/0330348 | A1 | 11/2018 | Uhr et al. |
| 2018/0330349 | A1 | 11/2018 | Uhr et al. |
| 2018/0349621 | A1* | 12/2018 | Schvey .................... G09C 1/00 |
| 2018/0349893 | A1* | 12/2018 | Tsai ..................... G06Q 20/3821 |
| 2019/0102409 | A1* | 4/2019 | Shi .......................... H04L 63/08 |
| 2019/0109713 | A1 | 4/2019 | Clark et al. |
| 2019/0205563 | A1 | 7/2019 | Gonzales, Jr. |
| 2019/0205870 | A1 | 7/2019 | Kamalsky et al. |
| 2019/0205873 | A1 | 7/2019 | Kamalsky et al. |
| 2019/0205894 | A1 | 7/2019 | Gonzales et al. |
| 2019/0207759 | A1 | 7/2019 | Chan et al. |
| 2019/0207995 | A1 | 7/2019 | Gonzales, Jr. |
| 2020/0012763 | A1* | 1/2020 | Arngren ................. H04L 63/045 |
| 2020/0110821 | A1 | 4/2020 | Chan et al. |
| 2020/0119905 | A1 | 4/2020 | Revankar et al. |
| 2020/0195436 | A1 | 6/2020 | Khan |
| 2020/0235926 | A1 | 7/2020 | Chan et al. |

FOREIGN PATENT DOCUMENTS

| | | |
|---|---|---|
| CN | 106920169 A | 7/2017 |
| CN | 107077682 A | 8/2017 |
| CN | 107086909 A | 8/2017 |
| CN | 107273759 A | 10/2017 |
| CN | 107798650 A | 3/2018 |
| CN | 107070644 A | 8/2018 |
| KR | 10-1781583 B1 | 9/2017 |
| WO | 2016/128567 A1 | 8/2016 |
| WO | 2017/004527 A1 | 1/2017 |

(56) References Cited

FOREIGN PATENT DOCUMENTS

| | | |
|---|---|---|
| WO | 2017/006136 A1 | 1/2017 |
| WO | 2017/027900 A1 | 2/2017 |
| WO | 2017/066002 A1 | 4/2017 |
| WO | 2017/090041 A1 | 6/2017 |
| WO | 2017/098519 A1 | 6/2017 |
| WO | 2017/145003 A1 | 8/2017 |
| WO | 2017/145017 A1 | 8/2017 |
| WO | 2017/145047 A1 | 8/2017 |
| WO | 2017/148245 A1 | 9/2017 |
| WO | 2017/153495 A1 | 9/2017 |
| WO | 2017/163069 A1 | 9/2017 |
| WO | 2017/163220 A1 | 9/2017 |
| WO | 2017/178956 A1 | 10/2017 |
| WO | 2017/182601 A1 | 10/2017 |
| WO | 2017/195160 A1 | 11/2017 |
| WO | 2017/196701 A1 | 11/2017 |
| WO | 2019/133307 A1 | 7/2019 |
| WO | 2019/133308 A1 | 7/2019 |
| WO | 2019/133309 A1 | 7/2019 |
| WO | 2019/133310 A1 | 7/2019 |
| WO | 2020/076535 A1 | 4/2020 |

OTHER PUBLICATIONS

Non-Final Office Action received for U.S. Appl. No. 15/858,949, dated Aug. 30, 2019, 10 pages.
Response to Non-Final Office Action filed Nov. 21, 2019, for U.S. Appl. No. 15/858,949, dated Aug. 30, 2019, 14 pages.
Ateniese, et al., "Redactable Blockchain—or—Rewriting History in Bitcoin and Friends", IEEE European Symposium on Security and Privacy, Mar. 11, 2017, pp. 1-38.
Kishigami, et al., "The Blockchain-Based Digital Content Distribution System", 2015 IEEE Fifth International Conference on Big Data and Cloud Computing, Aug. 1, 2015, 4 pages.
International Search Report received for PCT Application No. PCT/US2018/065851, dated Feb. 18, 2019, 4 pages.
Written Opinion received for PCT Application No. PCT/US2018/065851, dated Feb. 18, 2019, 6 pages.
International Search Report received for PCT Application No. PCT/US2018/065852, dated Feb. 19, 2019, 4 pages.
Written Opinion received for PCT Application No. PCT/US2018/065852, dated Feb. 19, 2019, 6 pages.
International Search Report received for PCT Application No. PCT/US2018/065854, dated Feb. 21, 2019, 3 pages.
Written Opinion received for PCT Patent Application No. PCT/US2018/065854, dated Feb. 21, 2019, 6 pages.
International Search Report received for PCT Application No. PCT/US2018/065860, dated Feb. 19, 2019, 3 pages.
Written Opinion received for PCT Application No. PCT/US2018/065860, dated Feb. 19, 2019, 6 pages.
Steichen, et al., "Blockchain-Based, Decentralized Access Control for IPFS", Retrieved from the Internet URL: <https://www.researchgate.net/publication/327034734>, Jul. 2018, pp. 1499-1506.
Adams, "A Tech Startup Wants to Use Blockchain to Make Event Tickets Fraud-Proof", Retrieved from the Internet URL: <https://www.forbes.com/sites/forbestreptalks/2017/06/15/a-tech-startup-upgraded-wants-to-use-blockchain-to-make-event-tickets-fraud-proof-and-to-sell-more-stuff-to-fans/#41659e3a7ffa>, Jun. 15, 2017, 5 pages.
Softjourn, "Blockchain Revolutionizes Ticketing", Blockchain in Ticketing. Why do ticketing companies need it?, Retrieved from the Internet URL: <https://softjourn.com/blockchain-in-ticketing>, Accessed on Sep. 11, 2018, 7 pages.
Event Chain, "Blockchain Secure Event Ticketing for Music, Festivals and Meetups", Retrieved from the Internet URL: <https://eventchain.io/>, Accessed on Sep. 11, 2018, 9 pages.
Keane, "Blockchain Startups Take on Ticket Touting, But Will They Gain Traction?", Retrieved from the Internet URL: <https://www.coindesk.com/blockchain-startups-take-ticket-touting-will-gain-traction/>, Jul. 30, 2017, 5 pages.
Blocktix, "Blocktix—an Ethereum Event Hosting Platform Designed for the Real World", Retrieved from the Internet URL: <https://blog.blocktix.io/blocktix-an-ethereum-event-hosting-platform-designed-for-the-real-world-d52f8a838ecc>, Jan. 25, 2017, 3 pages.
"Cloudchain—Ticketing Platform Based on Blockchain—Reply", Retrieved from the Internet URL: <http://www.reply.com/en/content/blockchain-ticketing-solution-cloudchain>, Accessed on Sep. 11, 2018, 3 pages.
Kosterova, "Crypto.tickets", Retrieved from the Internet URL: <https://blog.crypto.tickets/>, Accessed on Sep. 11, 2018, 2 pages.
"Guts Tickets—Honest ticketing", Retrieved from the Internet URL: <https://guts.tickets/>, Accessed on Sep. 11, 2018, 9 pages.
Aventus, "The Aventus Protocol: Blockchain for Ticketing", Retrieved from the Internet URL: <https://aventus.io/>, Accessed on Sep. 11, 2018, 9 pages.
Upgraded Tickets, "Digital "Smart" Tickets That Let You Trust Your Tickets and Maximize Your Event Experience", Retrieved from the Internet URL: <https://www.upgraded-inc.com/>, Accessed on Sep. 11, 2018, 14 pages.
Bidder Coin, "Biddeer Coin White Paper", v1.0, Dec. 28, 2017, 36 pages.
Chainfrog, "What are Smart Contracts?", Retrieved from the Internet URL: <http://www.chainfrog.com/wp-content/uploads/2017/08/smart-contracts.pdf>, 2017, 13 pages.
Chen et al., "Under-Optimized Smart Contracts Devour Your Money", Retrieved from the Internet URL: <https://arxiv.org/pdf/1703.03994.pdf >, Mar. 11, 2016, 5 pages.
Gollapudi, "White Paper—A Next-Generation Smart Contract and Decentralized Application Platform", Retrieved from the Internet URL: < https://github.com/ethereum/wiki/wiki/White-Paper/f18902f4e7fb21dc92b37e8a0963eec4b3f4793a >, May 29, 2017, pp. 1-23.
Kehrli, "Blockchain Explained", Retrieved from the Internet URL: <https://www.niceideas.ch/blockchain_explained.pdf>, Oct. 7, 2016, pp. 1-25.
Szabo, "Smart Contracts: Building Blocks for Digital Markets", Retrieved online from the Internet URL: <http://www.alamut.com/subj/economics/nick_szabo/smartContracts.html>, 1996, pp. 1-17.
Triantafyllidis, "Developing an Ethereum Blockchain Application", Retrieved from the Internet URL: <http://www.delaat.net/rp/2015-2016/p53/report.pdf >, Feb. 19, 2016, 59 pages.
White Paper, "An Introduction to PGP® Key Management Server from Symantec™", White Paper: PGP® Key Management Server from Symantec™, 2010, 15 pages.
Zhang, "Orthogonality Between Key Privacy and Data Privacy, Revisited", ResearchGate, Conference Paper, Aug. 2007, pp. 1-16.
Ramachandran et al, "Using Blockchain and smart contracts for secure data provenance management", Sep. 28, 2017, pp. 1-11.
Ethereum News, "Ethereum Wallets are Enabling Transaction Scheduling, Killer Feature", Retrieved from the Internet URL: <https://www.ccn.com/ethereum-wallets-are-enabling-transaction-scheduling-killer-feature/>, Sep. 18, 2018, 6 pages.
Ethereum, "blockchain—How can a contract run itself at a later time?", Retrieved from the Internet URL:<https://ethereum.stackexchange.com/questions/42/how-can-a-contract-run-itself-at-a-later-time>, Sep. 24, 2018, 12 pages.
Ethereum Alarm Clock, "The Alarm Service is Now Available on the Testnet", Retrieved from the Internet URL: <http://blog.ethereum-alarm-clock.com/blog/2016/1/16/the-alarm-service-is-now-available-on-the-testnet>, Jan. 16, 2016, 2 pages.
Notice of Allowance received for U.S. Appl. No. 15/858,949, dated Feb. 3, 2020, 6 pages.
Non-Final Office Action received for U.S. Appl. No. 16/020,975, dated Feb. 28, 2020, 12 pages.
Response to Restriction Requirement filed on Apr. 17, 2020 for U.S. Appl. No. 16/041,671, dated Mar. 30, 2020, 15 Pages.
Restriction Requirement Received for U.S. Appl. No. 16/041,671, dated Mar. 30, 2020, 7 pages.
Non Final Office Action Received for U.S. Appl. No. 16/041,680, dated Feb. 26, 2020, 10 pages.
Non Final Office Action Received for U.S. Appl. No. 16/181,814, dated Feb. 20, 2020, 20 pages.

(56) References Cited

OTHER PUBLICATIONS

Notice of Non Compliant Amendment received for U.S. Appl. No. 16/041,671, dated Apr. 23, 2020, 2 pages.
Applicant Initiated Interview Summary Received for U.S. Appl. No. 16/041,680, dated May 1, 2020, 3 pages.
Applicant Initiated Interview Summary Received for U.S. Appl. No. 16/181,814, dated May 5, 2020, 3 pages.
Response to Non-Final Office Action Filed on May 14, 2020 for U.S. Appl. No. 16/181,814, dated Feb. 20, 2020, 20 pages.
Response to Non-Final Office Action filed on May 18, 2020 for U.S. Appl. No. 16/041,680, dated Feb. 26, 2020, 16 pages.
Response to Non-Final Office Action filed on May 22, 2020 for U.S. Appl. No. 16/020,975, dated Feb. 28, 2020, 15 Pages.
Corrected Notice of Allowability received for U.S. Appl. No. 15/858,949, dated Jun. 10, 2020, 2 pages.
Applicant Initiated Interview Summary Received for U.S. Appl. No. 16/020,975, dated Jun. 2, 2020, 2 pages.
Response to Notice of Non-Compliant Amendment filed on Jun. 22, 2020, for U.S. Appl. No. 16/041,671, dated Apr. 23, 2020, 14 Pages.
Corrected Notice of Allowability received for U.S. Appl. No. 16/041,680, dated Jul. 8, 2020, 2 pages.
Notice of Allowance received for U.S. Appl. No. 16/041,680, dated Jun. 10, 2020, 8 pages.
Notice of Allowance received for U.S. Appl. No. 16/181,814, dated Jul. 20, 2020, 15 Pages.
Supplemental Amendment Filed on Jul. 10, 2020 for U.S. Appl. No. 16/181,814, dated Feb. 20, 2020, 12 pages.
Bhargavan et al., "Short Paper: Formal Verification of Smart Contracts", retrieved From Internet URL<http://research.microsoft.com/en-us/um/people/nswamy/papers/solidether.pdf>, Aug. 27, 2016, pp. 1-6.
Huckle et al., "Internet ofThings, Blockchain and Shared Economy Applications", Procedia Computer Science. Elsevier B.V. 98: 463., 2016, pp. 461-466.
International Preliminary Report on Patentability received for PCT Application No. PCT/US2018/065851, dated Jul. 9, 2020, 8 pages.
International Preliminary Report on Patentability Received for PCT Application No. PCT/US2018/065852, dated Jul. 9, 2020, 8 pages.
International Preliminary Report on Patentability received for PCT Application No. PCT/US2018/065854, dated Jul. 9, 2020, 8 pages.
International Preliminary Report on Patentability received for PCT Application No. PCT/US2018/065860, dated Jul. 9, 2020, 8 pages.
Craig Srpoule: "Statement regarding Forward-Looking Statements", Retrieved from the Internet URL: <URL:https://www.crowdmachine.com/docs/whitepaper.pdf>, Feb. 1, 2018, 12 pages.
International Search Report received for PCT Application No . PCT/US2019/053779, dated Dec. 5, 2019, 3 pages.
International Written Opinion received for PCT Application No . PCT/US2019/053779, dated Dec. 5, 2019, 7 pages.
Anonymous, "Is Blockchain the Answer to Copyright Issues?", Retrieved from the Internet URL:<https://medium.com/contentos-io/is-blockchain-the-answer-to-copyright-issues-f93344329295>, May 11, 2018, 3 pages.
Chan, "Motif Finding", Retrieved from the Internet URL: <https://www.mathworks.com/matlabcentral/fileexchange/29362-motif-finding>, Nov. 15, 2010, 4 pages.
Gipp et al., "CryptSubmit: Introducing Securely Timestamped Manuscript Submission and Peer Review Feedback Using the Blockchain", 2017 ACM/IEEE Joint Conference on Digital Libraries (JCDL). IEEE, Jun. 19, 2017, 4 pages.
Kong et al., "High obfuscation plagiarism detection using multi-feature fusion based on Logical Regression mode", 2015 4th International Conference on Computer Science and Network Technology (ICCSNT), Dec. 19, 2015, 5 pages.

* cited by examiner

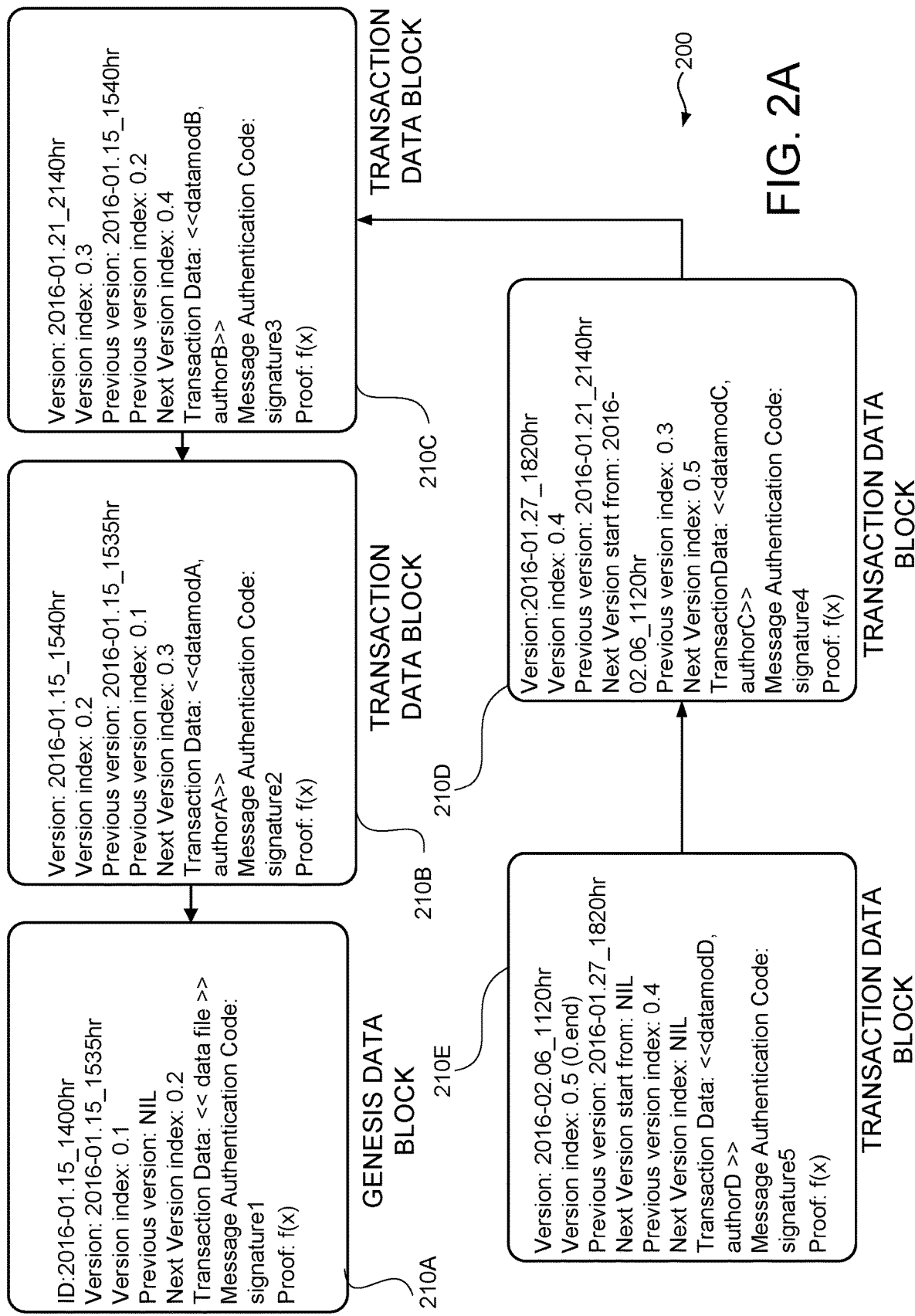

```
TRANSACTION DATA BLOCK

METHODS
Edit(data, author)
/* Called by author of data file or modification */
{
        signature = EditReq(data, author) /* Notify owner re edit */
        if(owner sends signature)
                LinkDataBlock(data, author, signature /* Link data
                        block to data file blockchain);
}

EditReq(data, author)
 /* Call owner to approve edit */
{
        SendMsg(data, author) /* Send message to owner */
}

Confirm(signature)
/* Called by owner using owner signature to verify block. */
{
        cipher = hash(signature, nonce) /* Generate signature for
block */
        signblock  /* Sign data block to confirm edit */

}

GetDataFile()
/* Called by entity to obtain data file */
{
        File = SearchBlockchain()
        return(File)
}
```

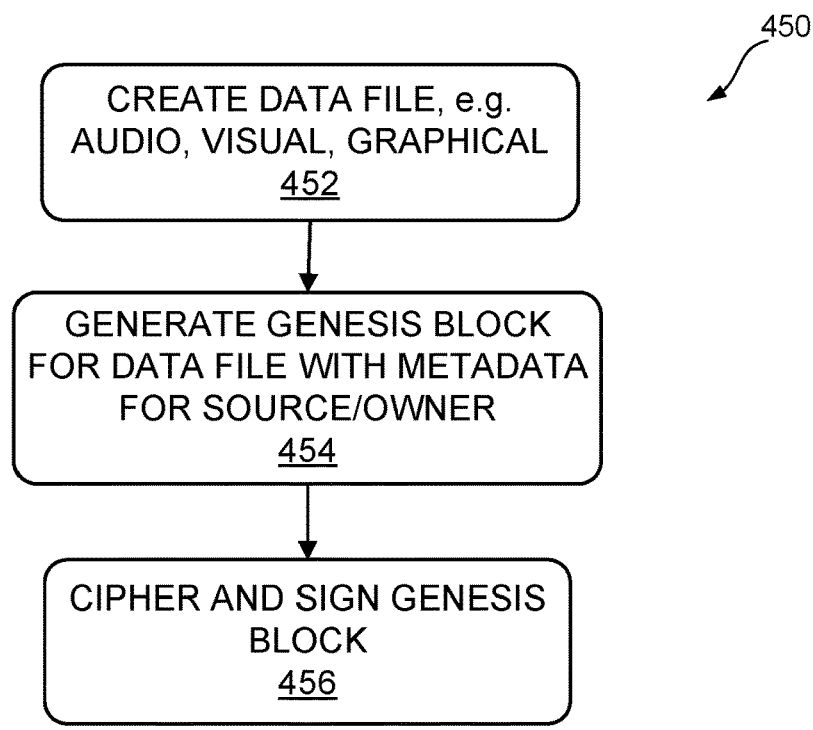
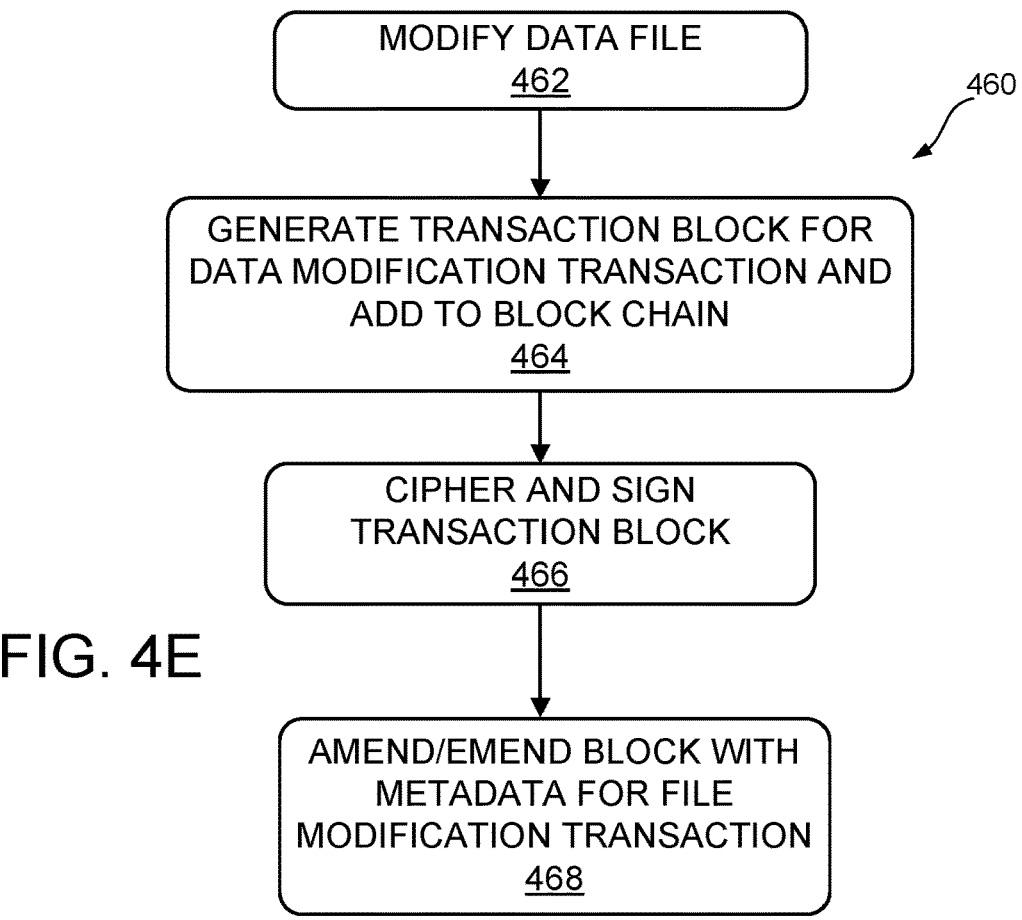
FIG. 4D
FIG. 4E

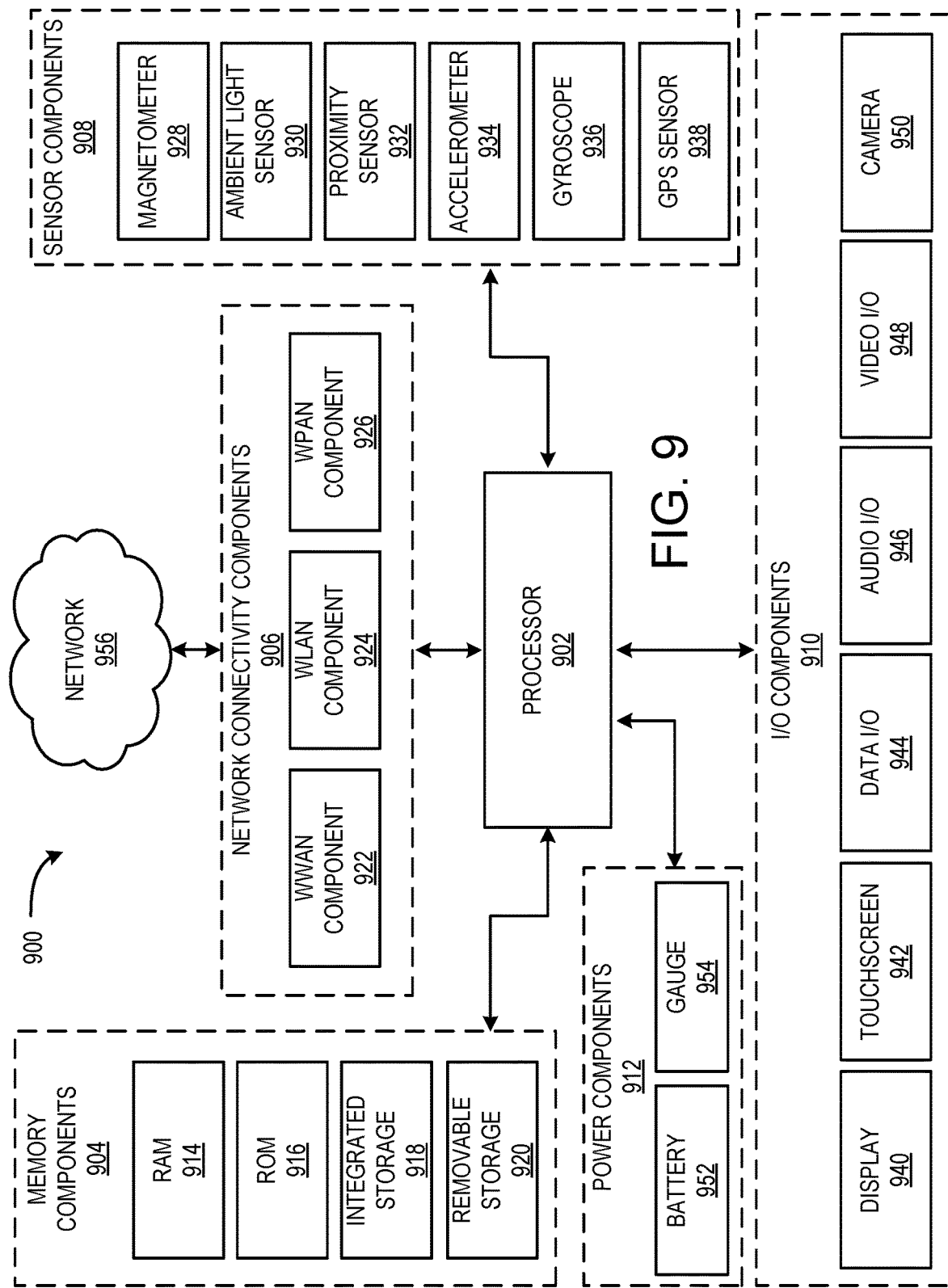

SECURE MANAGEMENT OF DATA FILES USING A BLOCKCHAIN

CROSS REFERENCE TO RELATED APPLICATIONS

This application claims the benefit of U.S. Provisional Patent Appl. No. 62/612,091 for "Enhanced Distributed Database and Data Communications Operations" filed Dec. 29, 2017, herein incorporated by reference in its entirety for all purposes.

BACKGROUND

Data files, such as voice, image, video or graphical files, can typically be modified with little or no evidence that the file has been changed. For example, text files are relatively easily modified using a text editor application. All or a portion of an image file can be modified using a graphics editing application such as PHOTOSHOP from ADOBE SYSTEMS of San Jose, Calif., to change the image in the file. Audio data in an audio file or video data in a video file may modified, removed or added. Without access to an original file, it is often not apparent that the file has been altered.

Files in a computer system can be access controlled to prevent modification of a file. However, such access controls are ineffective if the file is shared or distributed outside of the access controlled computer system. It may be difficult or impossible for ultimate recipients of the shared or distributed file to know whether their copy is the same as the original file. An additional complication is introduced if the originator of the file continues to modify the file.

It is with respect to these and other considerations that the disclosure made herein is presented.

SUMMARY

The disclosed technology is directed toward a data file management system that is secure, transparent and traceable. In one aspect of the technology, a data block or smart contract is created for a data file that can include the data file itself or metadata relating to content of the data file. The data block or smart contract is committed to a blockchain, where it is secured and tracked. When the data file is edited by a trusted user, such as an owner or originator of the data file, a transaction block is created that includes the edited file or the edits. The transaction block is signed by the trusted user and linked to the blockchain. In this manner, transactions corresponding to transaction blocks that are signed by the trusted user are assured to be authentic. Modifications made by a non-trusted user cannot be added to the blockchain.

The disclosed technology provides a secure blockchained data file modification ledger that enables traceability of modifications to the data file to determine authenticity. By creating blocks representing data modification transactions and chaining the blocks in an unbroken blockchain, a secure blockchained data file modification ledger is created. In some examples, mechanisms are provided for a trusted user to add metadata to each block that logs information relevant to the modification transaction, e.g. who performed the modifications, nature of modifications, date. Only the transaction blocks signed by the trusted user represent the authentic data file.

In some examples, entities other than the trusted user can modify the data file and the transaction data blocks containing the modifications are added to the blockchain if the trusted user signs the transaction data blocks to confirm authenticity.

By maintaining the data file and modifications on a blockchain, the data file and modifications can be made available to users so that they have visibility into the authenticity of the data file. For example, an authenticated version of the data file can be made publicly viewable using the blockchain without a risk of the data file being corrupted or modified by an untrusted user.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 2A is a data architecture diagram showing an illustrative example of a data file management blockchain securing a data file sources and where each modification to the data file is secured with a new transaction data block on the blockchain;

FIG. 3B is a data architecture diagram showing an illustrative example of a transaction data block on a data file management blockchain that includes code for methods for editing, approving edits, confirming transaction data blocks, and obtaining a data file from the data file management blockchain;

FIG. 4D is a control flow diagram illustrating another example of a process for an owner to create a data file on a data file management blockchain;

FIG. 4E is a control flow diagram illustrating another example of a process for an owner of a data file on a data file management blockchain to modify the data file and store the modification in a transaction block linked to the data file management blockchain;

FIG. 9 is a computer architecture diagram illustrating a computing device architecture for a computing device capable of implementing aspects of the techniques and technologies presented herein.

DETAILED DESCRIPTION

Figure 1:
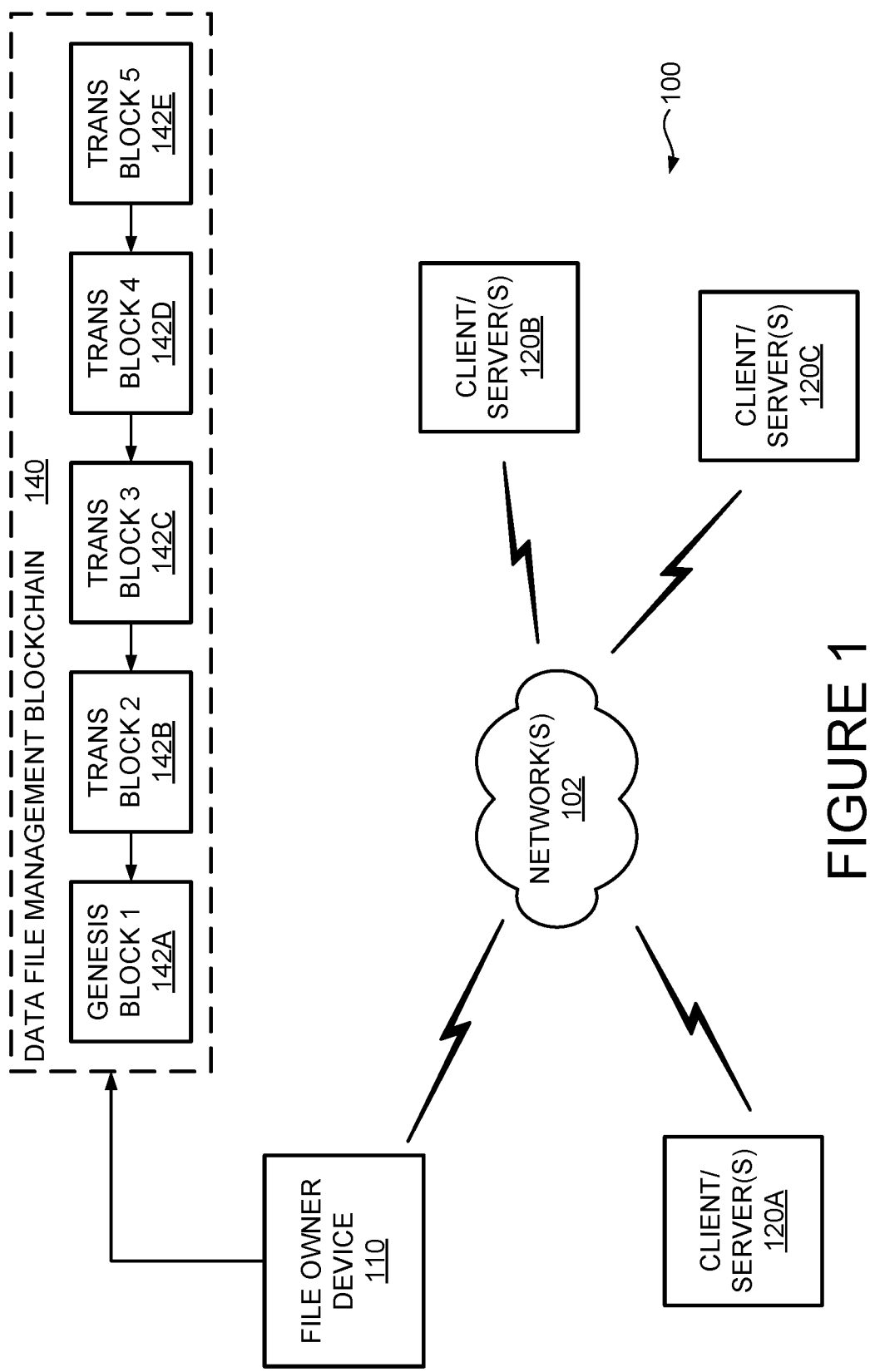
FIG. 1 is an architectural diagram showing an illustrative example of a system for a data file management blockchain.

The following Detailed Description describes technologies for the use of a blockchain in a data file management system that maintains a data file secured on a data file management blockchain and permits authorized modifications to the data file.

A data file is securely maintained on a blockchain by an owner or source of a data file. The data file cannot be modified without authorization or approval of the owner. Authorized modifications are stored in transaction data blocks linked to the data file management blockchain. A technical advantage of the disclosed data file management technology includes the distributed nature of the blockchain, which prevents an unauthorized entity from modifying or corrupting the data file at any single point.

The data can also be widely exposed or made accessible via the blockchain. Users can obtain a copy of the data file from the blockchain that is assured to be authentic. This feature of the disclosed technology has a technical advantage in that a data file can be widely distributed or accessible, but users are assured of the authenticity of the data file by the blockchain.

Modifications to the data file are stored in transaction data blocks linked to the data file management blockchain. This feature has a technical advantage that modifications to the data file can be tracked and traced. The modifications to the data file are also transparent to users who rely on the data file, which can increase trust in the content of the data file.

Conventionally, data files, once out of the control of the owner or source of the data file, can often be modified with little or no evidence that the data file has been changed. A data file can be secured on a particular system, such as a client device or a networked storage domain, but this limits the availability to the user of the client device or users authorized to access the networked storage domain.

Once a data file is disseminated, however, the owner or source of the data file typically loses control of the data file. For example, a data file that is made accessible to the public is exposed to a risk of degradation from parties that are malicious or have an interest in altering the data file. For example, audio data may be added to or removed from a data file that results in an audio recording stored in the data file that expresses statements that do not accurately represent the original statements made in the original recording. In another example, an image in a data file may be altered to change the appearance of the image. Similar problems can occur in other types of data, such as video, fingerprints, design documents, etc. In each case, because the data file may be modified in a way that is difficult or impossible to detect, the data file becomes unreliable to users of the data file. The disclosed technology can provide transparency, traceability and security for the data file.

In certain simplified examples of the disclosed technologies, a method, system or computer readable medium for secure management of a data file involves generating a genesis block for a data file management blockchain, where the genesis block includes a data file to be managed, and signing the genesis block to commit the genesis block to the data file management blockchain. One or more transaction data blocks for the data file management blockchain are generated, where each transaction data block includes a modification to the data file, and the transaction data blocks are signed to commit each transaction data block to the data file management blockchain.

In other examples of the disclosed technology, the modification to the data file in each of the one or more transaction data blocks includes data describing a change to the data file and involves receiving a request for the data file. Responsive to the request for the data file, the one or more transaction data blocks of the data file management blockchain are traced back to the genesis block. A current version of the data file is generated by applying the modification to the data file in each of the one or more transaction data blocks to the data file in the genesis block in a sequence determined by an order of the one or more transaction data blocks in the data file management blockchain.

In still other examples, the modification to the data file in each of the one or more transaction data blocks includes a complete version of the data file including one or more modifications to the data file and involves, responsive to a request for the data file, identifying a most recent transaction data block of the one or more transaction data blocks of the data file management blockchain and returning the version of the data file in the most recent transaction data block.

Another feature of disclosed technology provides for receiving a request to edit the data file from an entity, the request to edit including a modification of the data file and an identifier corresponding to the entity, and, responsive to the request to edit, sending an edit request to a file owner entity for the data file, the edit request including the identifier corresponding to the entity. Upon receiving a confirmation message from the file owner entity with a signature, a transaction data block corresponding to the request to edit is signed with the signature received in the confirmation message.

In some examples, each of the one or more transaction data blocks includes metadata identifying an entity corresponding to the data modification of the data file in the transaction data block. In other examples, the data file in the genesis block and the modification to the data file in each of the one or more transaction data blocks are encrypted. In still other examples, each of the one or more transaction data blocks includes metadata identifying entities that are authorized to perform at least one of edit the data file or access the data file.

These are simplified examples and many factors may be considered in a system for maintaining a data file using a blockchain as will be discussed in greater detail below.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, a data file management blockchain is used to securely maintain a data file even when the data file is made widely available. For increased transparency, code for editing and accessing the data file can be included in the transaction data blocks of the data file management blockchain. Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for a data file management blockchain ledger will be described. As will be described in more detail below with respect to the figures, there are a number of applications and services that may embody the functionality and techniques described herein.

FIG. 1 is an architectural diagram showing an illustrative example of data file management system 100 utilizing a data file management blockchain 140 to securely maintain a data file. In the embodiment of FIG. 1, blockchain 140 can be a publicly available blockchain that supports scripting, such the ETHEREUM blockchain, which supports a SOLIDIFY scripting language or BITCOIN, which supports a scripting language called SCRIPT.

A file owner device 110 initiates data file management blockchain 140 by creating genesis block 142A. Genesis block 142A, in this example, includes a data file provided by the file owner using device 110, such as an audio, text, image, video or graphics file. In other embodiments, the file owner device 110 may be replaced by another computing owner device, such as a computer on a peer-to-peer network, or other computing device.

In the example of FIG. 1, the data file provided by file owner device 110 and secured on data file management blockchain 140, where the data file can be made accessible to other entities, such as client/servers 120A, 120B or 120C. The client/servers 120 can communicate with file owner device 110 as well as a network of servers that supports and maintains blockchain 140. For example, the ETHERIUM blockchain platform from the ETHERIUM FOUNDATION of Switzerland provides a decentralized, distributed computing platform and operating system that provides scripting functionality.

In one example, file owner device 110 controls the data file in data file management blockchain 140 and can revise the data file by submitting modification data in transaction data blocks 142B, 142C, 142D and 142E in this example. Although file owner device 110 maintains control over the data file and modification to the data file management blockchain 140, the data file can be made accessible to other entities. For example, data file management blockchain 140 may be viewable to the public through the use of applications that can access blockchain information. Or, in another example, the data file management blockchain 140 may be restricted to being viewable only to client/servers 120 that are identified as being authorized to access in blockchain 140. By providing access to the data file management blockchain 140, this approach allows users to rely on the authenticity of the data file that is maintained on the data file management blockchain 140 under the control of the file owner, e.g. the user of file owner device 110.

FIG. 2A is a data architecture diagram illustrating a simplified example of a data file management blockchain ledger 200 based on the blocks 142A-E of the data file management blockchain ledger 140 of FIG. 1. The data file management blockchain ledger 200 example of FIG. 2A is simplified to show block headers, metadata and signatures of blocks 210A-E in order to demonstrate modifications to a data file that are traceable and secure using a blockchain. In outline, a blockchain ledger may be a globally shared transactional database.

The blockchain ledger 200 may be arranged as a Merkle tree data structure, as a linked list, or as any similar data structure that allows for cryptographic integrity. The blockchain ledger 200 allows for verification that data has not been corrupted or tampered with because any attempt to tamper will change a Message Authentication Code (or has) of a block, and other blocks pointing to that block will be out of correspondence. In one embodiment of FIG. 2A, each block may point to another block. A block may comprise one or more transactions. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed—such as exploring whether molecules interact a certain way during a computational search for an efficacious drug compound.

The blocks 210 of data file management blockchain 200 in the example of FIG. 2A shows modifications to the data file being modified secured with a new transaction data block on the blockchain. In this example, file owner device 110 of FIG. 1 includes a complete data file in the transaction data when it creates genesis data block 210A. The file owner device 110 signs the genesis block 210A and the blockchain system within which blockchain 200 is created verifies the genesis data block based on a proof function.

Note that a variety of approaches may be utilized that remain consistent with the disclosed technology. In some examples, the file owner is the only entity permitted to make modifications to the data file on the blockchain. In other examples, other entities may be permitted to make modifications under the control of the file owner. In some examples, each transaction data block in the blockchain includes a complete copy of the data file. In other examples, the modifications in each transaction data block identify the differences between the previous version of the data file and the newly modified version of the data file.

In the example of FIG. 2A, the modifications to the data file are stored as difference data from the previous version and other entities, e.g. authors, are permitted to modify the data file. To modify the data file management blockchain ledger 200, file owner device 110 creates transaction data block 210B, which identifies a modification to the data file, e.g. datamodA, performed by an entity authorized to modify the data file, e.g authorA.

The file owner device 110 signs transaction data block 210B and commits the block to blockchain 200 for verification by the blockchain platform. Similarly, file owner device 110 creates transaction data block 210C to secure modifications to the data file, e.g. datamodB, made by author. Likewise, transaction data block 210D is created to add the modifications datamodC made to the data file by author. Further, transaction data block 210E is created to record the modifications datamodD made by authorD. In this approach the current version of the data file is obtained by compiling the modifications in each of transaction data blocks 210B, 210C, 210D and 210E back to the genesis data block 210A traced through the data file management blockchain 200.

Figure 2B:
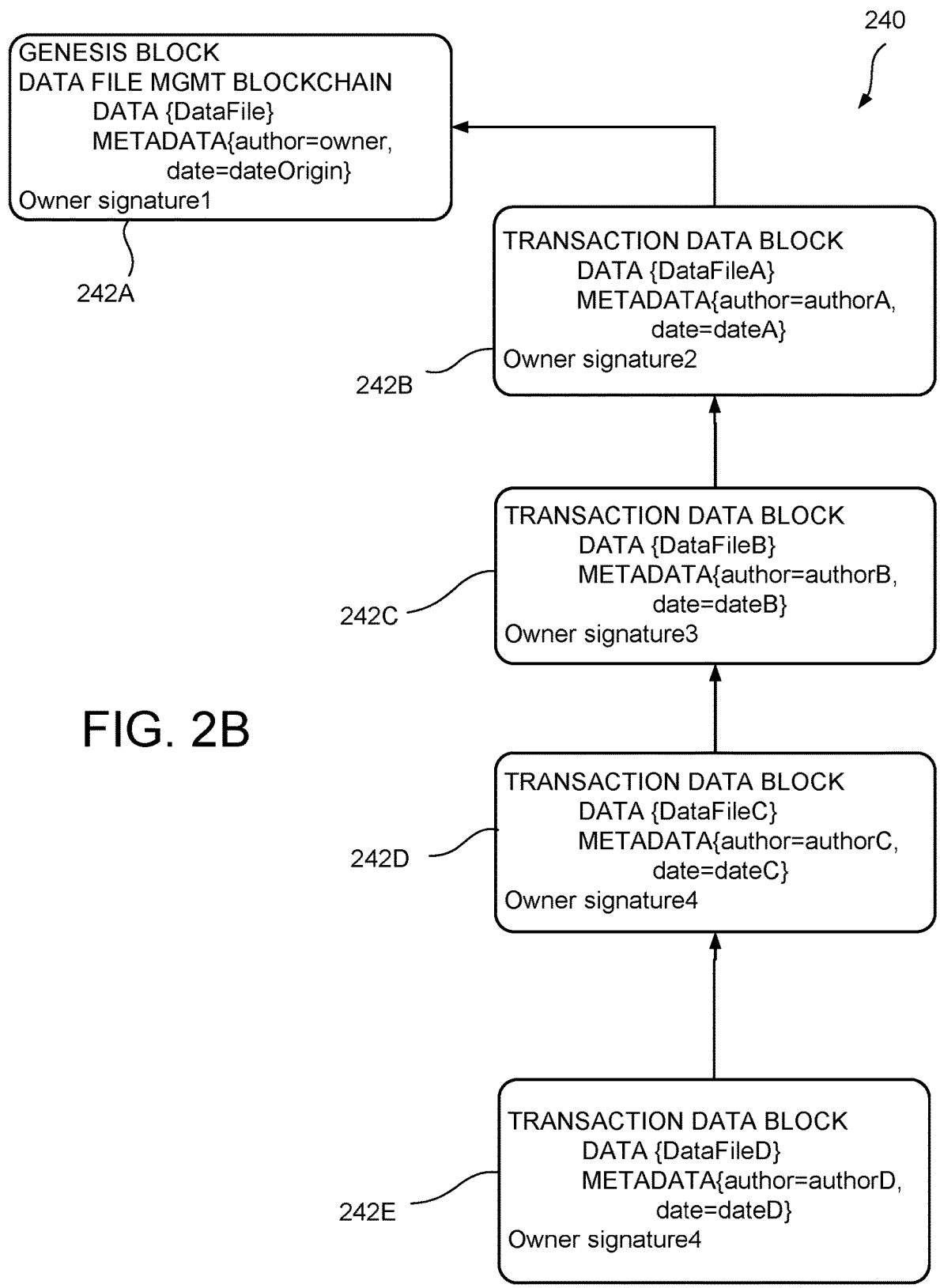
FIG. 2B is a data architecture diagram showing another illustrative example of a data file management blockchain where each block on the blockchain includes a complete copy of a version of the data file.

FIG. 2B is a data architecture diagram showing another illustrative example of a data file management blockchain 240 that takes a different approach wherein each transaction data block 242 on the blockchain 240 includes a complete copy of the data file for each modification version along with metadata identifying the author of the modified version and a date for the modification. In this approach, genesis block 242A contains the data file DataFile with metadata identifying the file owner as the author along with the origination date for the data file management blockchain 240.

To modify the data file, file owner device 110 creates transaction data block 242B, which contains a new version of the data file, DataFileA, along with metadata identifying the author of this modification as authorA and the date of the modification, dateA. Similarly, transaction data block 242C secures a modified data file DataFileB created by author on dateB. Transaction data block 242D secures another modified version of the data file DataFileC created by authorC on dateC. Transaction data block 242E secures still another modified version of the data file DataFileD created by authorD on dateD. Each of the transaction data blocks 242 is signed by the file owner device 110 and committed to the blockchain 240 for verification by the blockchain platform. Generally, the approach of FIG. 2A utilizes more computation resources while the approach of FIG. 2B utilizes more data storage resources.

Figure 2C:
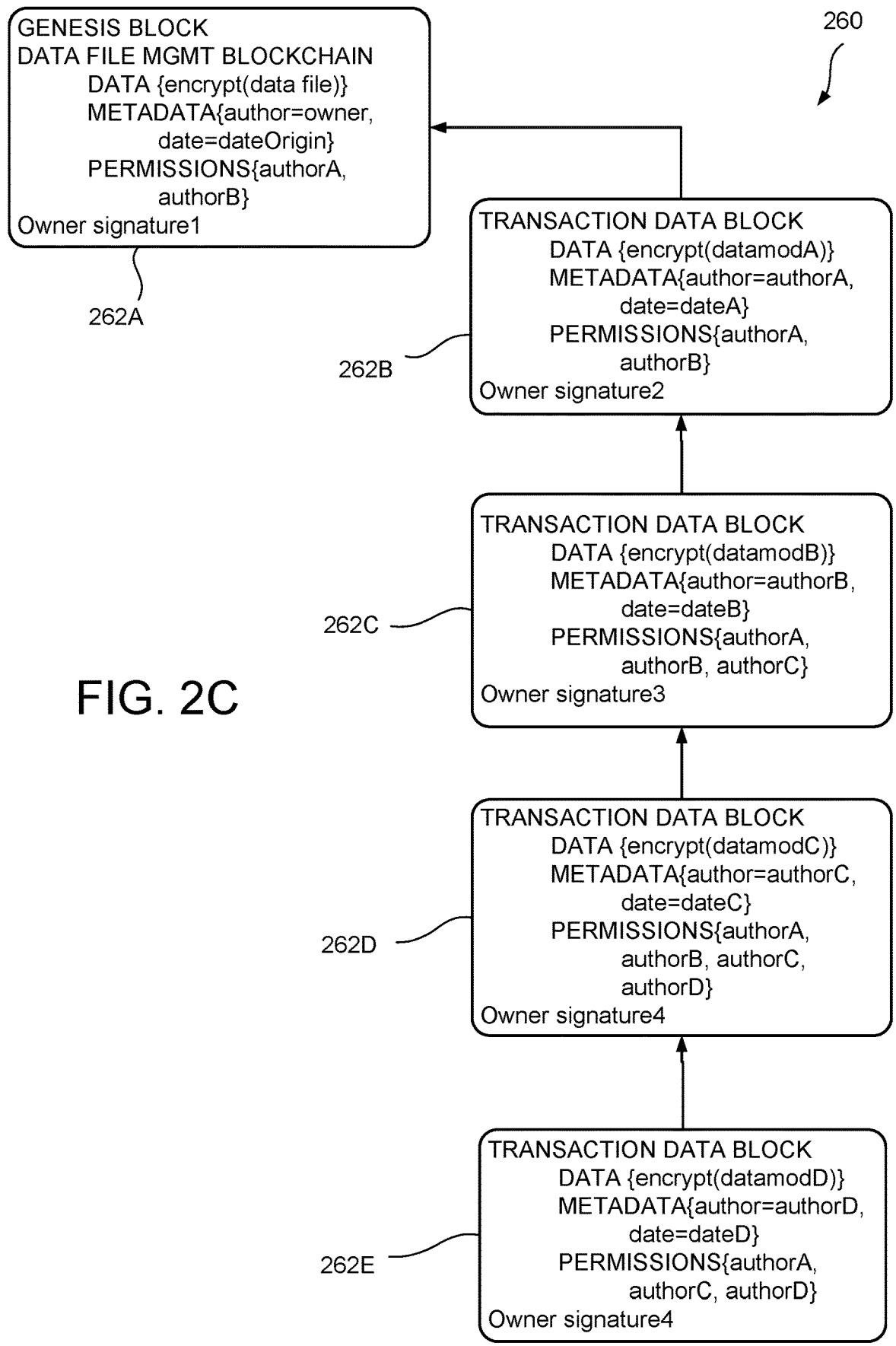
FIG. 2C is a data architecture diagram showing another illustrative example of a data file management blockchain where the data file and modifications to the data file are encrypted in each block on the blockchain and permissions for editing the data file are included in each block.

A wide variety of approaches may be utilized that are consistent with the present approach. FIG. 2C is a data architecture diagram showing still another illustrative example of a data file management blockchain 260 that takes another approach wherein the data for the data file and modifications in transaction data block 262 on the blockchain 260 are encrypted and include metadata identifying the author of each modified version and a date for the modification. In this example, a list of entities authorized to modify the data file is included in PERMISSIONS. The file owner device 110 can be utilized to determine the entities identified in PERMISSIONS and the scripts for the transaction data blocks modified to check the PERMISSIONS field to determine if the entity modifying the data file is authorized by the file owner.

Figure 3A:
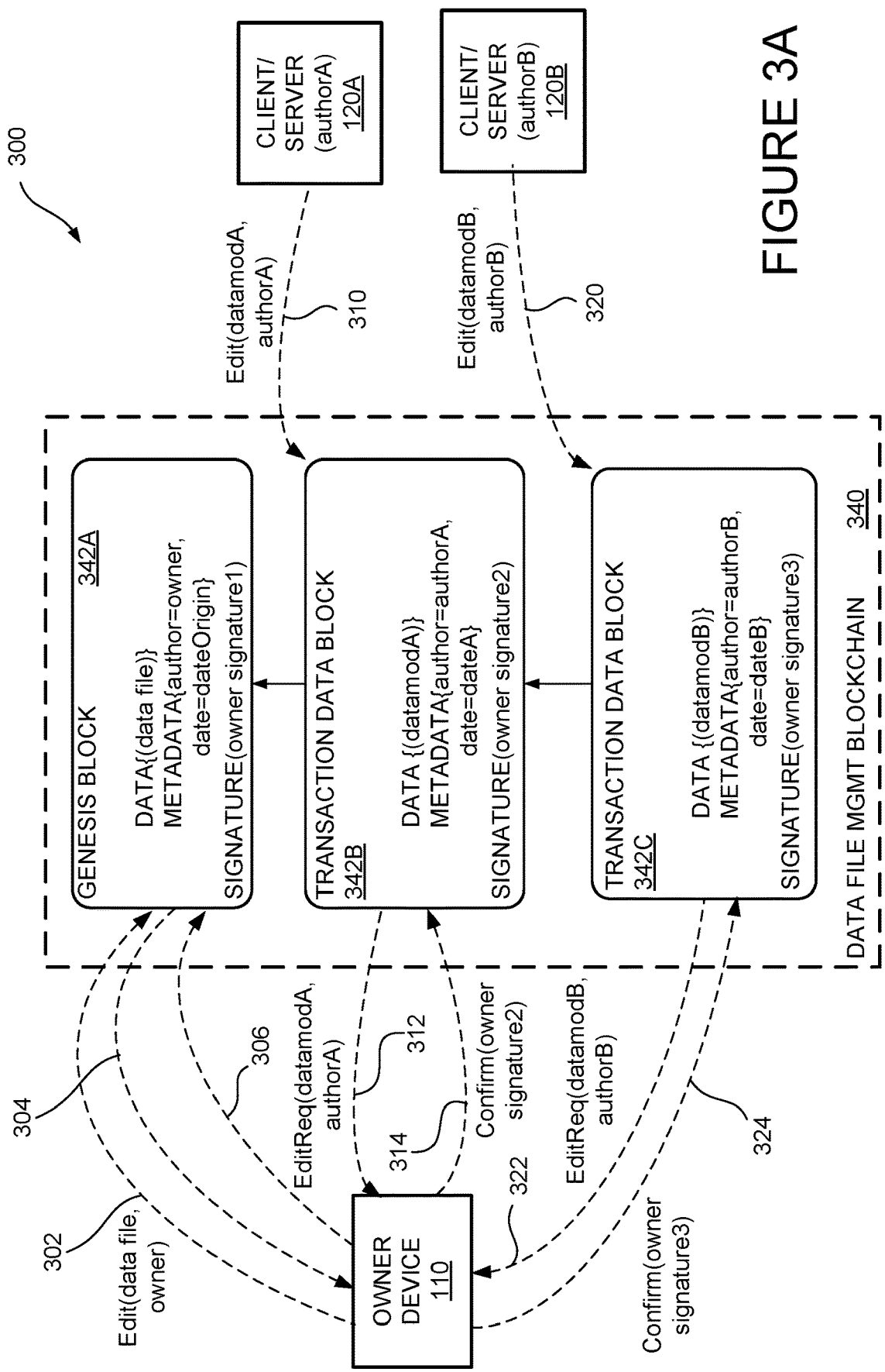
FIG. 3A is a data architecture diagram showing an illustrative example of an owner of a data file storing the data file on a data file management blockchain and approving edits made to the data file.

The data file management blockchain 140 enables a data file to be securely stored and modified. FIG. 3A is a data architecture diagram showing an illustrative example of the use of a data file management blockchain for file management. In this example, client/server entity 120A and client/server entity 120B are each used to perform a modification of the data file that is authorized and stored on data file management blockchain 340.

In this illustrative scenario, genesis block 342A is created by file owner device 110 by invoking an Edit method in the genesis block, at 302, to store a data file, e.g. an audio file, a video file, a text document, an image, etc. FIG. 3B provides an example of a data block 342 with methods defined for interacting with the block. At 304, the genesis block 342A prompts the owner to confirm the addition of the data file, which is confirmed by owner device 110, at 306, which signs genesis block 342A and genesis block is verified by the blockchain platform. At this point, the initial data file is stored on blockchain 340 and the genesis block 342A includes the data file as well as metadata describing the author and date for the data.

To submit a modification, at 310, client/server 120A initiates an Edit method in the transaction data block 342B that includes the data modification (datamodA) and author (authorA). Transaction data block 342B sends an EditReq message to owner device 110, at 312, to prompt the owner to authorize the edit by authorA. If the owner authorizes the edit, owner device 110 sends a Confirm message, at 314, to sign transaction data block 342B and commit the block to data file management blockchain 340. At this point in the processing, data file management blockchain 340 contains genesis block 342A with the original data file and transaction data block 342B with the modifications to the data file specified by datamodA.

Subsequently, a user of client/server device 120B, author, submits, at 320, invokes the Edit method in transaction data block 342C with a data file modification (datamodB). Transaction data block 342C sends an EditReq message to owner device 110, at 322, to prompt the owner to authorize the edit by authorB. If the owner authorizes the edit, owner device 110 sends a Confirm message, at 324, to sign transaction data block 342C and commit the block to data file management blockchain 340. At this point in the processing, data file management blockchain 340 contains genesis block 342A with the original data file, transaction data block 342B with the modifications to the data file specified by datamodA, and transaction data block 342C with the modifications to the data file specified by datamodC.

In the example of FIG. 3A, the current version of the data file can be obtained by tracing the blocks of data file management blockchain 340 to the genesis block 342A and applying each of the data modifications, e.g. datamodA and datamodB, to the original data file of genesis block 342A. The disclosed technology enables the data file to be securely stored and edited on the data file management blockchain 340 under the control of the file owner. The edits are also traceable so that changes to the data file can be tracked. The signature on each of the blocks 342 ensures the authenticity of the data file and modifications.

The Edit, EditReq and Confirm scripts are secured by the transaction data blocks 342 of data file management blockchain 340 and executed by the operating system of the decentralized, distributed blockchain platform. FIG. 3B is a data architecture diagram showing an illustrative example of transaction data block 342 that includes the Edit, EditReq, Confirm and GetDataFile code for data edit and access transactions on the data file management blockchain 340.

In the example scenario of FIG. 3A, the Edit script is invoked by the client/server 120 that is submitting an edit along with an identifier for the author making the edit. The Edit script calls the EditReq script with the modification data and author identifier to send a message to the file owner device 110 with the data modification and author identifier. File owner device 110, in this example, determines whether the modification is authorized based on the author identifier and, if the modification is authorized, calls the Confirm method with the owner's signature to sign the transaction data block and confirm the edit transaction.

The GetDataFile script is invoked by an entity seeking to obtain an authentic current version of the data file. The GetDataFile script traces the blocks of data file management blockchain 340 to the genesis block 342A and applies each of the data modifications, e.g. datamodA and datamodB, to the original data file of genesis block 342A to create the current authentic version of the data file, which is returned to the entity that invoked the GetDataFile script.

Figure 4A:
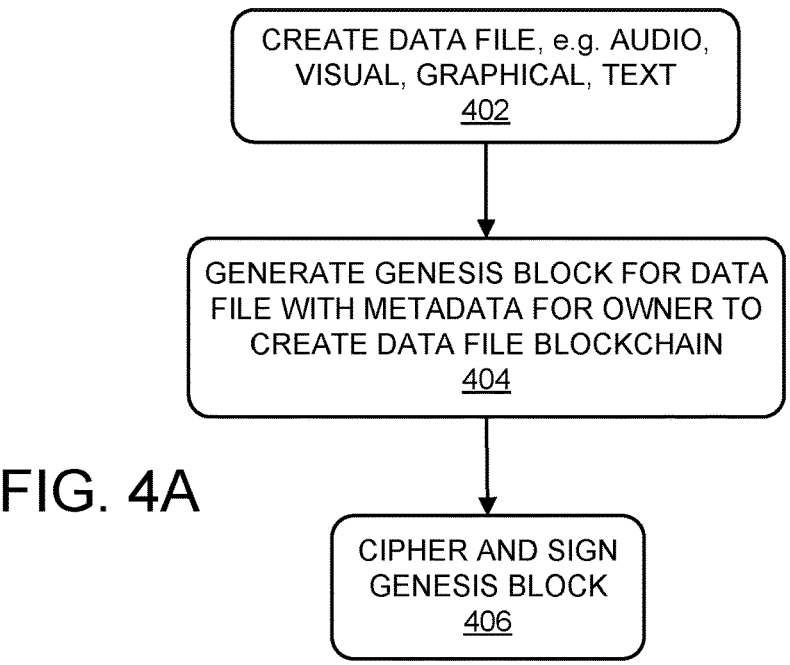
FIG. 4A is a control flow diagram showing an illustrative example of a process for creating and storing a data file on a data file management blockchain.

FIG. 4A is a control flow diagram showing an illustrative example of a process 400 for creating and storing a data file on a data file management blockchain in accordance with an aspect of the present approach. This example involves creating or providing a data file, at 402, and generating, at 404, a genesis block for the data file that includes the data file and metadata pertaining to the data file. At 406, the genesis block is ciphered and signed to commit the genesis block to the data file management blockchain, such as data file management blockchain 140 in FIG. 1 or data file management blockchain 340 in FIG. 3A.

Figure 4B:
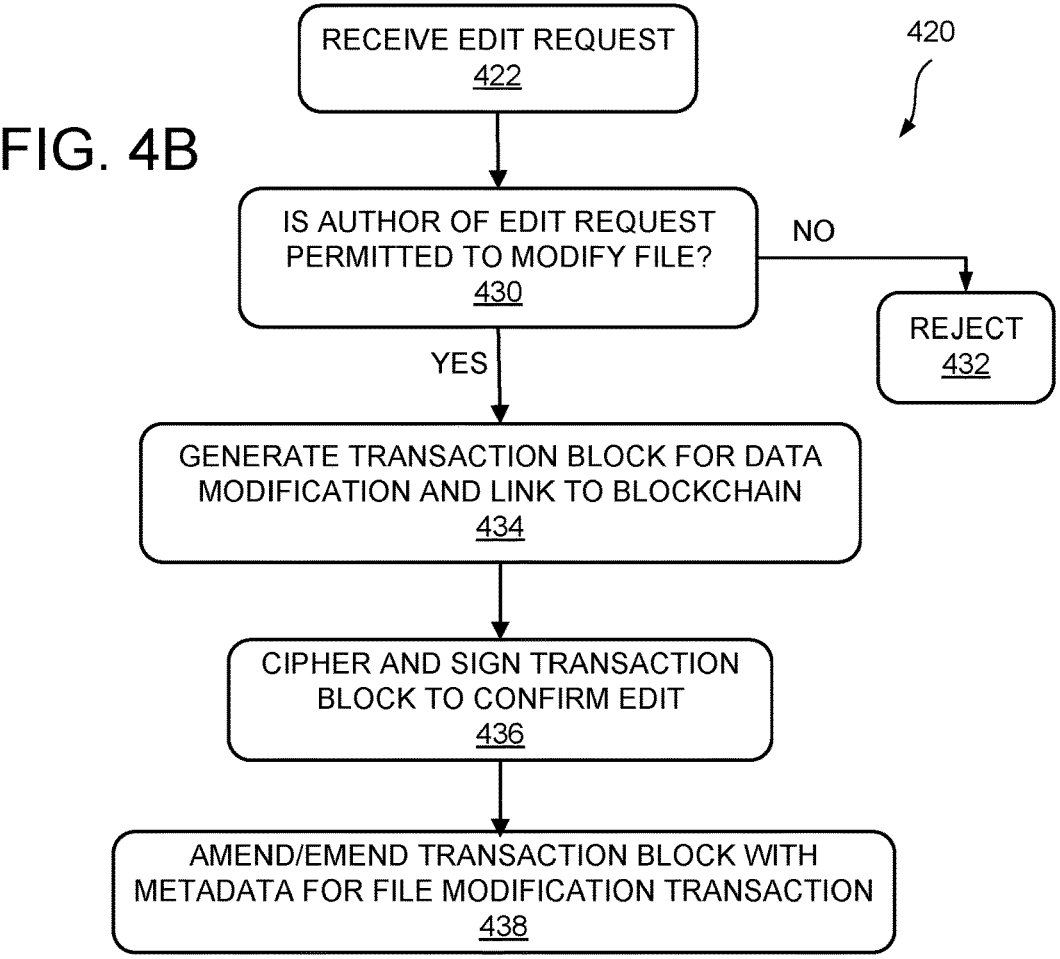
FIG. 4B is a control flow diagram showing an illustrative example of a process for approving edits to a data file on a data file management blockchain.

FIG. 4B is a control flow diagram showing an illustrative example of a process 420 for approving edits to a data file on a data file management blockchain. At 422, an edit request is received from an author entity, such as the Edit method invocation 310 from client/server 120A in FIG. 3A. At 430, a determination is made, e.g. by the owner device 110, as to whether the author entity submitted the Edit is authorized to edit the data file. If the author entity is not authorized, then control branches to 432 and the edit is rejected. If the author entity is authorized, then, at 434, a transaction data block is generated that contains the modification to the data file. At 436, the transaction data block is ciphered and signed to link the block to the data file management blockchain. For example, transaction data blocks 142 are generated and linked to the data file management blockchain 140 in FIG. 1, data file management blockchain 200 in FIG. 2A or data file management blockchain 250 in FIG. 2B. In some examples, at 438, the transaction data blocks may be amended or emended by the owner device 110 to include metadata pertaining to the data file and modifications stored on the data file management blockchain.

Figure 4C:
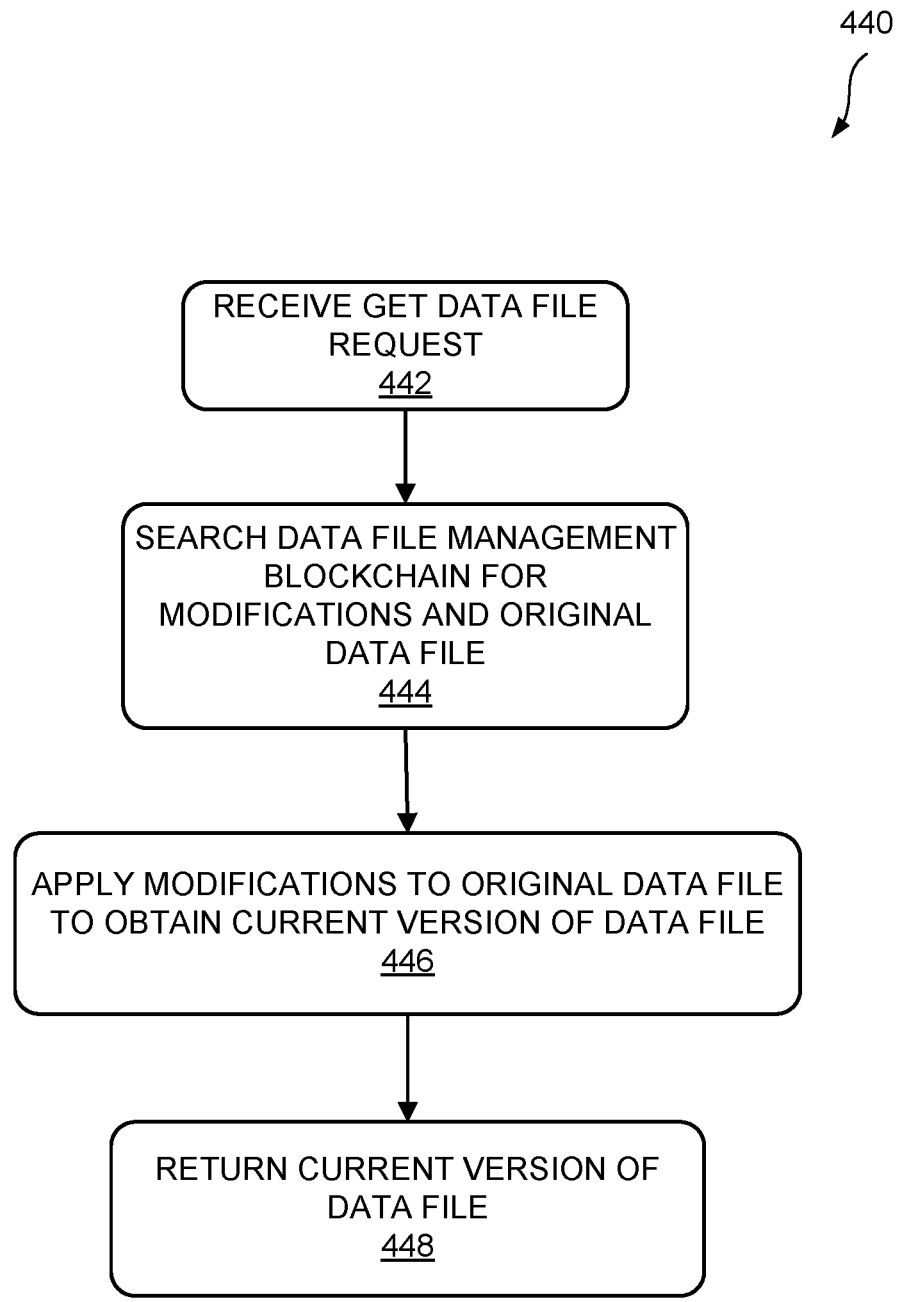
FIG. 4C is a control flow diagram illustrating an example of a process for obtaining a current version of a data file from a data file management blockchain

FIG. 4C is a control flow diagram illustrating an example of a process 440 for obtaining a current version of a data file from a data file management blockchain. At 442, a get data file request is received, e.g. the GetDataFile method is invoked. At 444, the data file management blockchain is searched or traced back to the genesis block to obtain the original data file and modifications to the data file. The modifications are applied to the original data file, e.g. sequentially apply each modification in the order determined in the blockchain, to obtain a current version of the data file. At 448, the current version of the data file is returned to the requesting entity.

A somewhat simpler example of data file management according to the disclosed technology limits modification of the data file to an owner device, such as owner device 110 of FIG. 1, e.g. the device of the user who created or provided the data file. In such an approach, the original source or owner for the data file is the only entity that modifies the data file.

FIG. 4D is a control flow diagram illustrating an example of a process 450 for an owner to create a data file on a data file management blockchain. At 452, the owner device creates or provides the original data file. At 454, the owner device generates the genesis block containing the original data file along with metadata describing the source or owner of the data file. At 456, the owner device ciphers and signs the genesis block to commit it to the data file management blockchain.

FIG. 4E is a control flow diagram illustrating an example of a process 460 for an owner of a data file on a data file management blockchain to modify the data file and store the modification in a transaction data block linked to the data file management blockchain. At 462, the owner of the data file makes a modification to the data file. At 464, a transaction data block is created that contains the modification to the data file or the modified data file. At 466, the owner ciphers and signs the transaction data block to commit the transaction data block to the data file management blockchain. In some examples, at 468, the transaction data blocks may be amended or emended by the owner device 110 to include metadata pertaining to the data file and modifications stored on the data file management blockchain.

The disclosed technology is useful for many real-world scenarios. For example, file owner device 110 may be controlled or operated by an artist who creates an image in a data file that is then secured on the data file management blockchain and made publicly available. The data file management blockchain secures the data file and any edits and ensures that a data file obtained from the blockchain represents the image as created by the artist.

In another example, file owner device 110 may be controlled or operated by an author who creates a document in a data file that is then secured on the data file management blockchain and then shared. The author maintains control over the data file, so the document can be shared with other authors who can provide edits that are authorized by the original author. The data file management blockchain secures the document in the data file along with any edits authorized by the original author and ensures that the document obtained from the blockchain represents the document as authorized by the author.

In still another example, file owner device 110 may be controlled or operated by user who generates an audio recording that is stored in a data file that is then secured on the data file management blockchain and then shared. The data file management blockchain secures the recording in the data file and ensures that the recording obtained from the blockchain represents the recording as originally created by the user.

In one more example, file owner device 110 may be controlled or operated by user who provides a fingerprint image that is stored in a data file that is then secured on the data file management blockchain and then shared. The data file management blockchain secures the image in the data file and ensures that the fingerprint image obtained from the blockchain represents the fingerprints as stored by the original user and have not been altered.

Access to the data file maintained on the data file management blockchain may be handled in a variety of ways. For increased transparency and availability, the blockchain can be initiated on a public blockchain with the data file being available to any person who can access the blockchain. Or the data file management blockchain can be configured to encrypt the data file and access to the data file controlled, such as my including an authorized access list or requiring a key obtained from the file owner. For example, access can be limited to entities identified in a list included in the data file management blockchain. In another example, the file owner distributes a key to entities in order to decrypt the data file.

Depending upon the scripting capabilities of the blockchain platform, the data blocks of the data file management blockchain may include more extensive code execution. For example, a data file management system that provides for shared editing access to the data file may require more extensive code execution capability in the blockchain than a data file management system that limits editing capability to the file owner. Similarly, a data file management system based on a data file management blockchain that encrypts the data file and controls access to the data file may require more extensive code execution capability in the blockchain than a data file management system that makes the data file publicly available in an unencrypted state.

It should be appreciated that the utilization of blockchain technology, such as scripting technology within smart contracts, in this context provides a high degree of flexibility and variation in the configuration of implementations without departing from the teachings of the present disclosure.

Note that the disclosed technology is not limited to maintaining a data file. The technology may be applied to secure management of data of many types. For example, the present technology can be configured to maintain a data set or database on a data file management blockchain. In such an example, the data set or database maintained on a data file management blockchain can be edited or modified by adding a new transaction data block to the blockchain.

Figure 5:
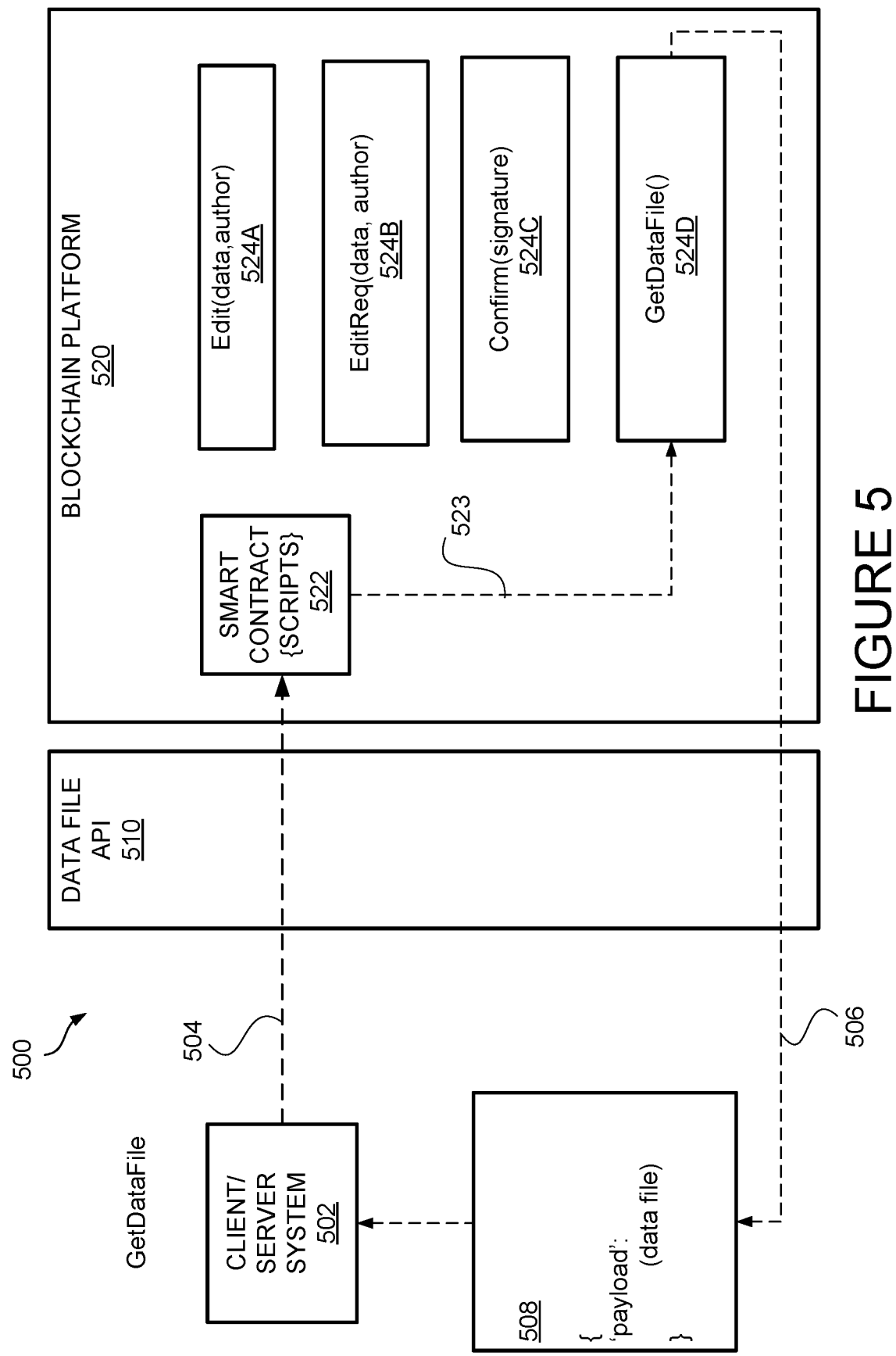
FIG. 5 is a data architecture diagram showing an illustrative example of a user using an application programming interface to access a data file secured on a data file management blockchain.

FIG. 5 is a data architecture diagram showing an illustrative example of a user accessing a data file maintained on a data file management blockchain, such as blockchain 140 in FIG. 1, blockchain 200 in FIG. 2A, blockchain 240 in FIG. 2B, blockchain 260 in FIG. 2C, or blockchain 340 in FIG. 3A. In this example, an evaluation Application Program Interface (API) 510 provides an interface to the blockchain platform 520 that supports the data file management blockchain. The blockchain platform 520 supports smart contract 522, such as transaction data block 342 in FIG. 3B, which includes scripts 524 with code that, when executed by the blockchain platform 520, performs operations with respect to the data file management blockchain.

In the example of FIG. 5, four scripts are defined in smart contract 522. The Edit script 524A provides the capability for an entity to edit a data file maintained on the data file management blockchain. The EditReq script 524B provides the capability for a file owner of the data file to be queried to authorize a modification to the data file made by another entity. The Confirmation script 524C provides the capability for the file owner to confirm an edit made by another entity in response to the EditReq script by ciphering and signing a transaction data block with the edit may by the other entity.

The GetDataFile script 524D provides the capability for an entity to obtain an authentic current version of the data file. For example, as discussed above with respect to the data file management blockchain of FIGS. 3A and 3B, the GetDataFile script traces the blocks of data file management blockchain 340 to the genesis block 342A and applies each of the data modifications to the original data file of genesis block 342A to create the current authentic version of the data file, which is returned to the entity that invoked the GetDataFile script. In another example, the GetDataFile script may perform a check to determine if the requesting entity is authorized to access the data file. In still another example, the GetDataFile script may decrypt an encrypted data file for return to the requesting entity. In a simple example, the GetDataFile script may simply return the data file in the most recent transaction data block on the data file management blockchain.

The scripts 524 shown are merely examples and many other different or additional scripts can be defined using the capability of the executable scripts in smart contract 522 as provided for on blockchain platform 520.

FIG. 5 shows a user's client/server system 502 submitting a GetDataFile request 504 to API 510. API 510 invokes smart contract 522 causing blockchain platform 520 to execute the GetDataFile script 524D to obtain an authentic copy of the most recent version of the data file as maintained on the data file management blockchain, which is returned to client/server system 502, at 506, in a payload of message 508.

Blockchain Ledger Data Structure

Figure 6A:
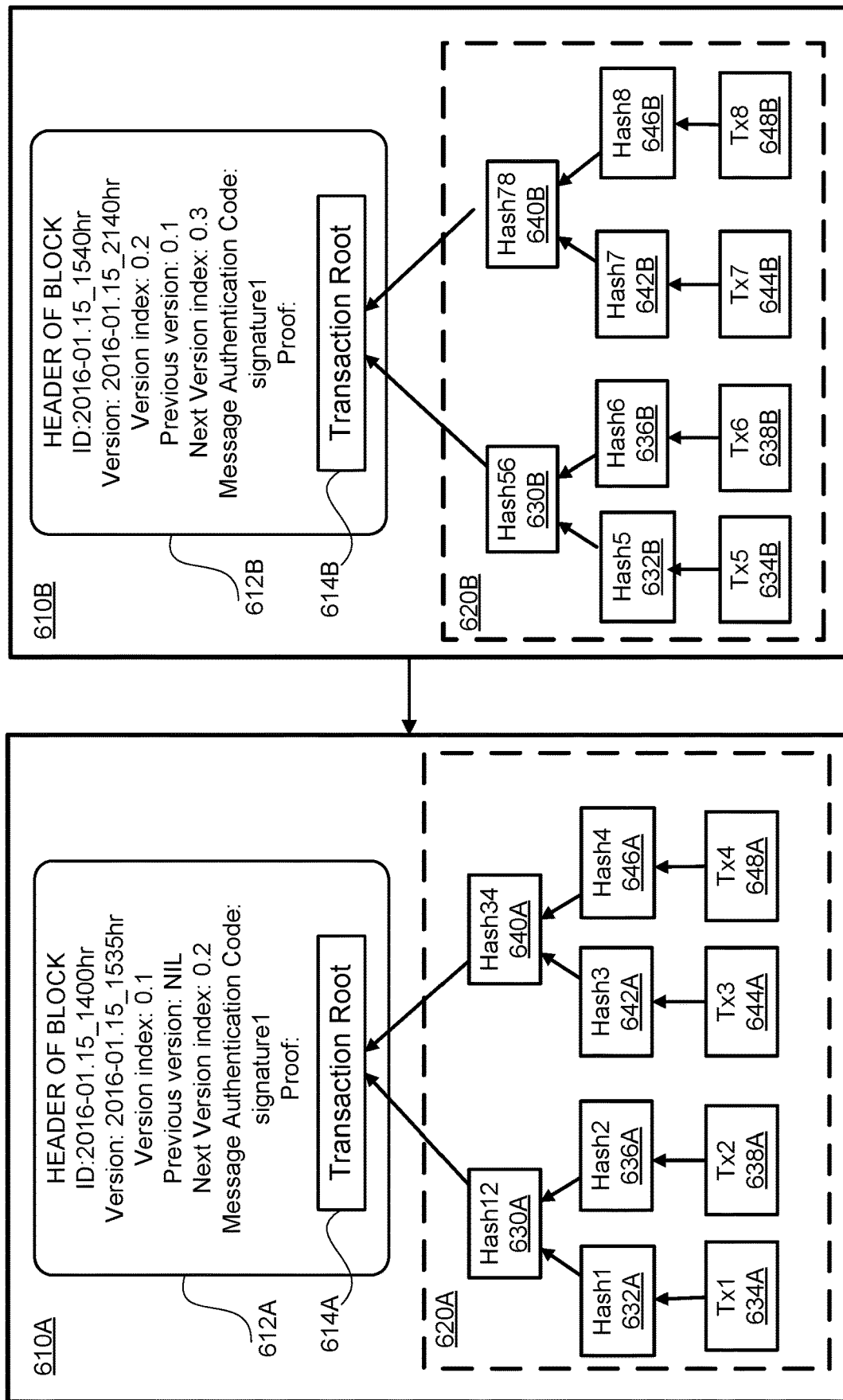
FIG. 6A is a data architecture diagram illustrating a simplified example of a blockchain ledger based on the transaction data blocks of the data file management blockchain of FIG. 1.

FIG. 6A is a data architecture diagram illustrating a simplified example of a blockchain ledger 600 based on the blocks 142A-E of the data file management blockchain 140 of FIG. 1. The blockchain ledger 600 example of FIG. 6A is simplified to show block headers, metadata and signatures of blocks 210A-E in order to demonstrate a secure data file management ledger using a blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
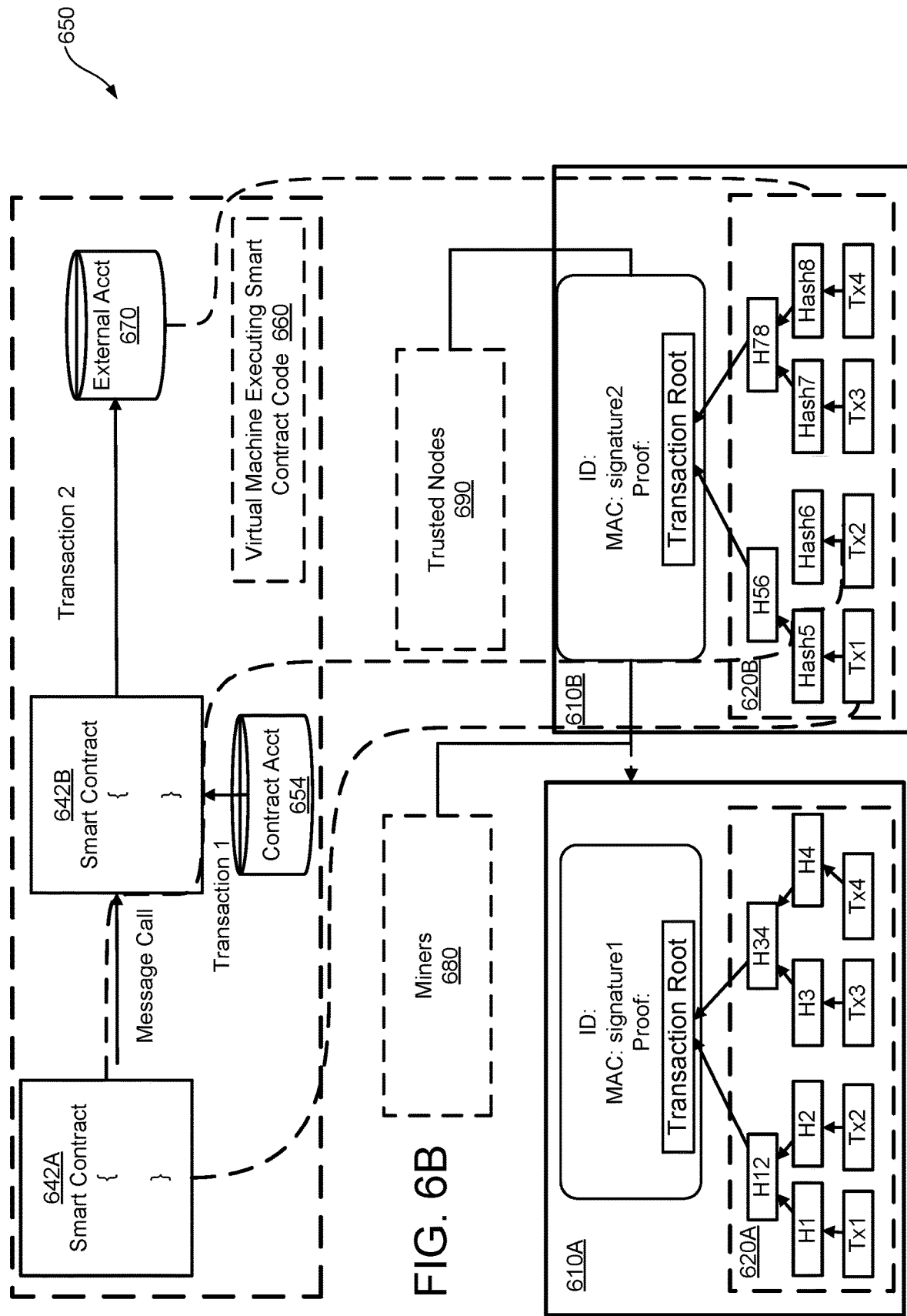
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 642 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 642 are executed in a virtual machine environment, although this is optional.

In FIG. 6B, the aspects of smart contracts 642 are stored in transaction data nodes in data tree 620 in the blocks 610 of the blockchain ledger of FIG. 6A. In the example of FIG. 6B, Smart Contract 642A is stored in data block Tx1 node 634A of data tree 620A in block 610A, Smart Contract 642B is stored in Tx2 node 638A, Contract Account 654 associated with Smart Contract 642B is stored in Tx3 node 644A, and External Account is stored in Tx4 node 648A.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process is determined by a centralized control of a cluster of trusted nodes. In this case, the centralized control may be a trusted node, such as file owner device 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a transaction data block 142 for data file management blockchain 140, the block is an unconfirmed and unidentified entity. To be part of the acknowledged "currency", it may be added to the blockchain, and therefore relates to the concept of a trusted cluster.

In a trusted cluster, when a transaction data block 142 is added, every node competes to acknowledge the next "transaction" (e.g. a modification to the data file or permissions). In one example, the nodes compete to mine and get the lowest hash value: min{previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to the data file, may also be ciphered for restricted access so that the meta-data does not disclose information pertaining to the data file.

Figure 4F:
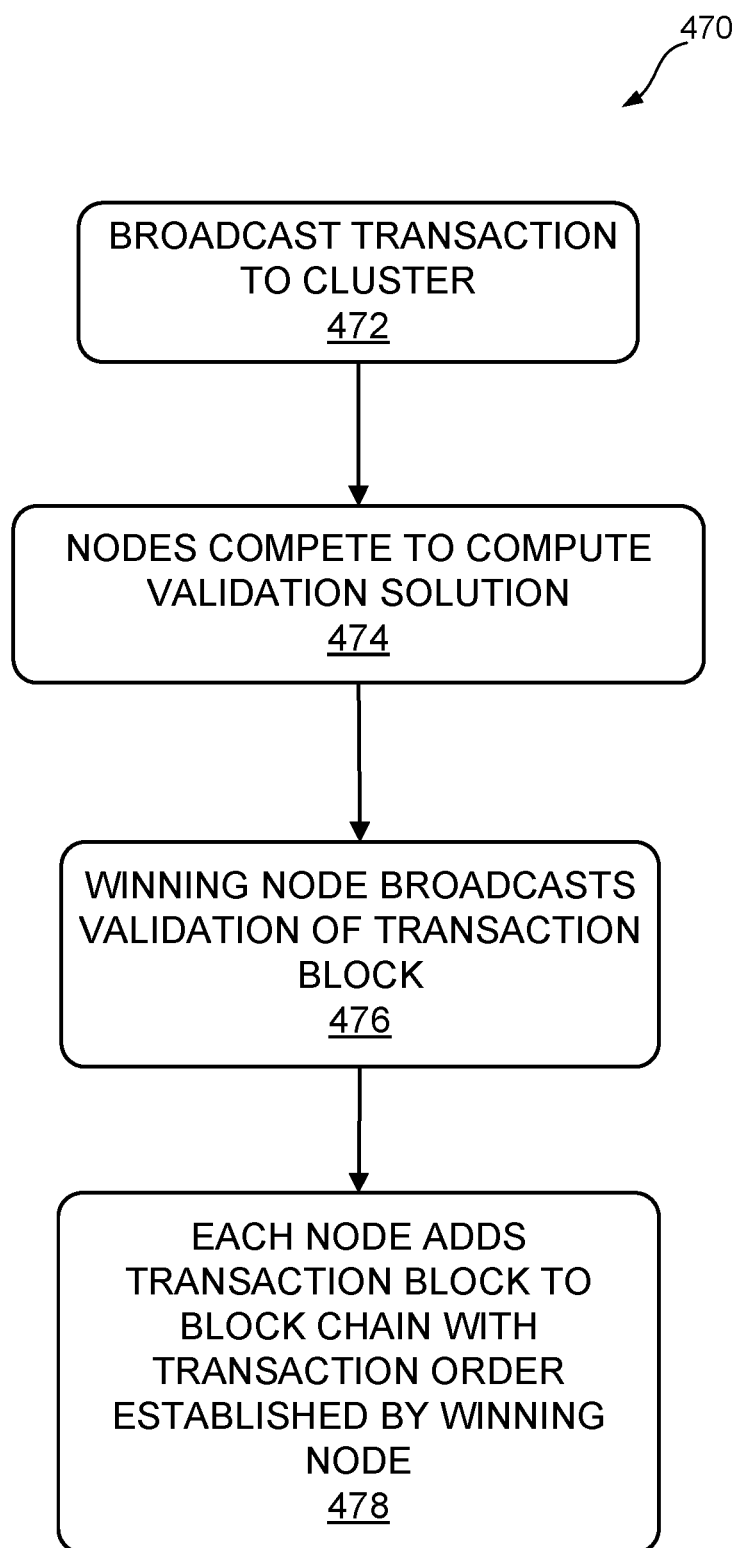
FIG. 4F is a control flow diagram illustrating an example of a validation process for blocks added to the personal information and authorized access data blockchain ledgers distributed to untrusted nodes.

The mining process, such as may be used in concert with the validation process 470 of FIG. 4F, may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast to the network using software. Mining nodes validate transactions, add them to the block they are building, and then broadcast the completed block to other nodes.

Note that in a restricted network, stake-holders who are authorized to check or mine for the data file may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the data file management blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the data file as centrally authorized and kept offline.

In some examples, access to a distributed data file management blockchain may be restricted by cryptographic means to be only open to authorized servers. Since the data file management blockchain ledger is distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a data file management blockchain ledger. The specific examples of different aspects of a data file management blockchain ledger described herein are illustrative and are not intended to limit the scope of the techniques shown.

Smart Contracts

Smart contracts are defined by code. As described previously, the terms and conditions of the smart contract may be encoded (e.g., by hash) into a blockchain ledger. Specifically, smart contracts may be compiled into a bytecode (if executed in a virtual machine), and then the bytecode may be stored in a blockchain ledger as described previously. Similarly, transaction data executed and generated by smart contracts may be stored in the blockchain ledger in the ways previously described.

Computer Architectures for Use of Smart Contracts and Blockchain Ledgers

Figure 8:
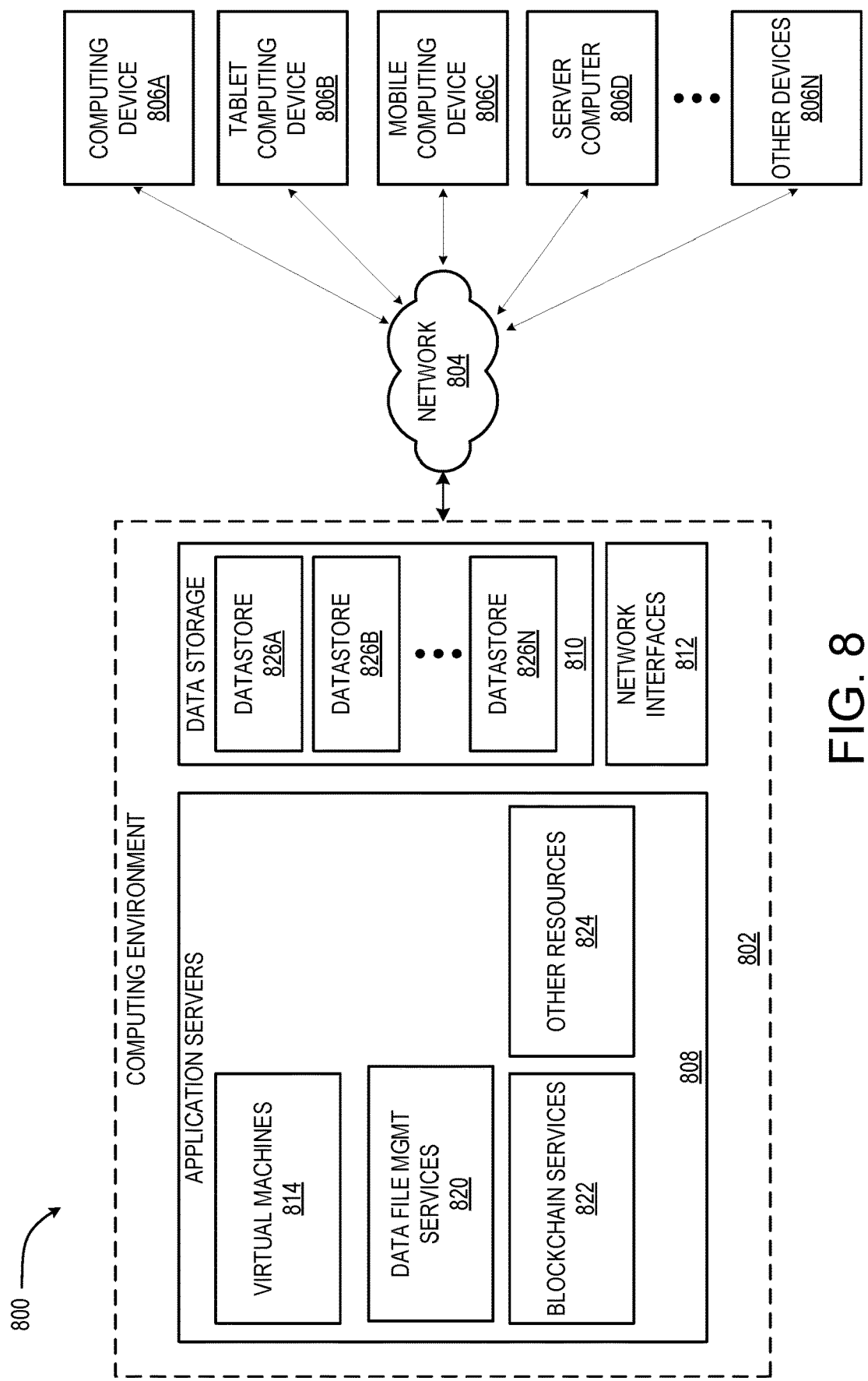
FIG. 8 is a diagram illustrating a distributed computing environment capable of implementing aspects of the techniques and technologies presented herein.

Note that at least parts of processes 400, 420, 440, 450, 460 and 470 of FIGS. 4A, 4B, 4C, 4D, 4E and 4F, the scripts of transaction data block 342 of FIG. 3B, smart contract 522 of FIG. 5, smart contracts 642 of FIG. 6B, and other processes and operations pertaining to a data file management blockchain ledger described herein may be implemented in one or more servers, such as computer environment 800 in FIG. 8, or the cloud, and data defining the results of user control input signals translated or interpreted as discussed herein may be communicated to a user device for display. Alternatively, the data file management blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below.

The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 420, 440, 450, 460 and 470 of FIGS. 4A, 4B, 4C, 4D, 4E and 4F, the scripts of transaction data 342 of FIG. 3B, smart contract 522 of FIG. 5, smart contracts 642 of FIG. 6B) are described herein as being implemented, at least in part, by an application, component, and/or circuit. Although the following illustration refers to the components of FIGS. 3B, 4A, 4B, 4C, 4D, 4E, 4F, 5 and 6B, 1, 5, 6 and 7, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 420, 440, 450, 460 and 470 of FIGS. 4A, 4B, 4C, 4D, 4E and 4F, the scripts of transaction data 342 of FIG. 3B, smart contract 522 of FIG. 5, smart contracts 642 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
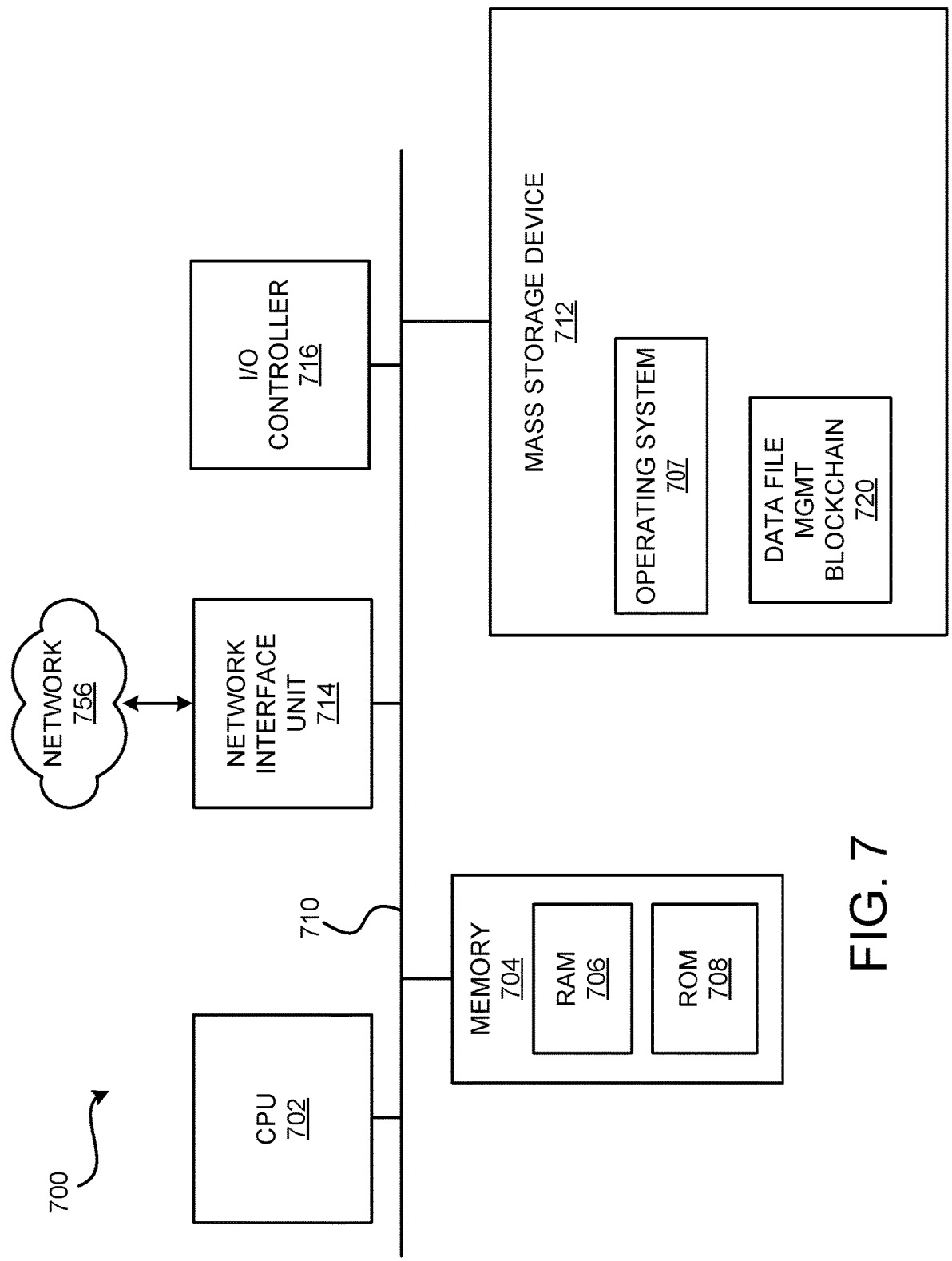
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the devices 110 and 120A-C (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of data file management blockchain data 720), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for a data file management blockchain ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 556, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for a data management blockchain ledger. It should be understood that this configuration is illustrative only and should not be construed as being limiting in any way.

According to various implementations, the application servers 808 also include one or more data file management services 820 and one or more blockchain services 822. The data file management services 820 can include services for managing a data file on a data file management blockchain, such as data file management blockchain 140 in FIG. 1. The blockchain services 822 can include services for participating in management of one or more blockchains, such as by creating genesis blocks, transaction data blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a data file management blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting a data file management blockchain ledger, among other aspects.

Turning now to FIG. 9, an illustrative computing device architecture 900 for a computing device that is capable of executing various software components is described herein for a data file management blockchain ledger. The computing device architecture 900 is applicable to computing devices that can manage a data file management blockchain ledger. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the file owner device 110 and client/servers 120A-C shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, MAC OS or IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

EXAMPLES OF VARIOUS IMPLEMENTATIONS

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following examples:

Example 1: A computer-implemented data file management method, the method comprising: generating a genesis block for a data file management blockchain, the genesis block including a data file to be managed; signing the genesis block to commit the genesis block to the data file management blockchain; generating one or more transaction data blocks for the data file management blockchain, each transaction data block including a modification to the data file; and signing each of the one or more transaction data blocks to commit each of the one or more transaction data blocks to the data file management blockchain.

Example 2: The computer-implemented method of example 1, where the modification to the data file in each of the one or more transaction data blocks comprises data describing a change to the data file and the method includes: receiving a request for the data file; responsive to the request for the data file, tracing the one or more transaction data blocks of the data file management blockchain back to the genesis block; generating a current version of the data file by applying the modification to the data file in each of the one or more transaction data blocks to the data file in the genesis block in a sequence determined by an order of the one or more transaction data blocks in the data file management blockchain; and returning the current version of the data file.

Example 3: The computer-implemented method of example 1, where the modification to the data file in each of the one or more transaction data blocks comprises a complete version of the data file including one or more modifications to the data file and the method includes: receiving a request for the data file; responsive to the request for the data file, identifying a most recent transaction data block of the one or more transaction data blocks of the data file management blockchain; and returning the version of the data file in the most recent transaction data block.

Example 4: The computer-implemented method of example 1, where the method includes: receiving a request to edit the data file from an entity, the request to edit including a modification of the data file and an identifier corresponding to the entity; responsive to the request to edit, sending an edit request to a file owner entity for the data file, the edit request including the identifier corresponding to the entity; receiving a confirmation message from the file owner entity with a signature; and signing a transaction data block corresponding to the request to edit with the signature received in the confirmation message.

Example 5: The computer-implemented method of example 1, where each of the one or more transaction data blocks includes metadata identifying an entity corresponding to the data modification of the data file in the transaction data block.

Example 6: The computer-implemented method of example 1, where the data file in the genesis block and the modification to the data file in each of the one or more transaction data blocks are encrypted.

Example 7: The computer-implemented method of example 1, where each of the one or more transaction data blocks includes metadata identifying entities that are authorized to perform at least one of edit the data file or access the data file.

Example 8: A system for data file management, the system comprising: one or more processors; and one or more memory devices in communication with the one or more processors, the memory devices having computer-readable instructions stored thereupon that, when executed by the processors, cause the processors to: generate a genesis block for a data file management blockchain, the genesis block including a data file to be managed; sign the genesis block to commit the genesis block to the data file management blockchain; generate one or more transaction data blocks for the data file management blockchain, each transaction data block including a modification to the data file; and sign each of the one or more transaction data blocks to commit each of the one or more transaction data blocks to the data file management blockchain.

Example 9: The system of example 8, where the modification to the data file in each of the one or more transaction data blocks comprises data describing a change to the data file and the memory devices include computer-readable instructions that, when executed by the processors, cause the processors to: receive a request for the data file; responsive to the request for the data file, trace the one or more transaction data blocks of the data file management blockchain back to the genesis block; generate a current version of the data file by applying the modification to the data file in each of the one or more transaction data blocks to the data file in the genesis block in a sequence determined by an order of the one or more transaction data blocks in the data file management blockchain; and return the current version of the data file.

Example 10: The system of example 8, where the modification to the data file in each of the one or more transaction data blocks comprises a complete version of the data file including one or more modifications to the data file and the memory devices include computer-readable instructions that, when executed by the processors, cause the processors to: receive a request for the data file; responsive to the request for the data file, identify a most recent transaction data block of the one or more transaction data blocks of the data file management blockchain; and return the version of the data file in the most recent transaction data block.

Example 11: The system of example 8, where the memory devices include computer-readable instructions that, when executed by the processors, cause the processors to: receive a request to edit the data file from an entity, the request to edit including a modification of the data file and an identifier corresponding to the entity; responsive to the request to edit, send an edit request to a file owner entity for the data file, the edit request including the identifier corresponding to the entity; receive a confirmation message from the file owner entity with a signature; and sign a transaction data block corresponding to the request to edit with the signature received in the confirmation message.

Example 12: The system of example 8, where each of the one or more transaction data blocks includes metadata identifying an entity corresponding to the data modification of the data file in the transaction data block.

Example 13: The system of example 8, where the data file in the genesis block and the modification to the data file in each of the one or more transaction data blocks are encrypted.

Example 14: The system of example 8, where each of the one or more transaction data blocks includes metadata identifying entities that are authorized to perform at least one of edit the data file or access the data file.

Example 15: A computer storage medium having computer executable instructions stored thereon which, when executed by one or more processors, cause the processors to execute a data file management method comprising: generating a genesis block for a data file management blockchain, the genesis block including a data file to be managed; signing the genesis block to commit the genesis block to the data file management blockchain; generating one or more transaction data blocks for the data file management blockchain, each transaction data block including a modification to the data file; and signing each of the one or more transaction data blocks to commit each of the one or more transaction data blocks to the data file management blockchain.

Example 16: The computer storage medium of example 15, where the modification to the data file in each of the one or more transaction data blocks comprises data describing a change to the data file and the method includes: receiving a request for the data file; responsive to the request for the data file, tracing the one or more transaction data blocks of the data file management blockchain back to the genesis block; generating a current version of the data file by applying the modification to the data file in each of the one or more transaction data blocks to the data file in the genesis block in a sequence determined by an order of the one or more transaction data blocks in the data file management blockchain; and returning the current version of the data file.

Example 17: The computer storage medium of example 15, where the modification to the data file in each of the one or more transaction data blocks comprises a complete version of the data file including one or more modifications to the data file and the method includes: receiving a request for the data file; responsive to the request for the data file, identifying a most recent transaction data block of the one or more transaction data blocks of the data file management blockchain; and returning the version of the data file in the most recent transaction data block.

Example 18: The computer storage medium of example 15, where the method includes: receiving a request to edit the data file from an entity, the request to edit including a modification of the data file and an identifier corresponding to the entity; responsive to the request to edit, sending an edit request to a file owner entity for the data file, the edit request including the identifier corresponding to the entity; receiving a confirmation message from the file owner entity with a signature; and signing a transaction data block corresponding to the request to edit with the signature received in the confirmation message.

Example 19: The computer storage medium of example 15, where each of the one or more transaction data blocks includes metadata identifying an entity corresponding to the data modification of the data file in the transaction data block.

Example 20: The computer storage medium of example 15, where the data file in the genesis block and the modification to the data file in each of the one or more transaction data blocks are encrypted.

What is claimed is:

1. A computer-implemented data file management method, the method comprising:
   generating a genesis block for a data file management blockchain, the genesis block including a data file to be managed;
   signing the genesis block to commit the genesis block to the data file management blockchain;
   generating one or more transaction data blocks for the data file management blockchain, each transaction data block including a modification to the data file;
   signing each of the one or more transaction data blocks to commit each of the one or more transaction data blocks to the data file management blockchain;
   receiving a request to edit the data file from a first entity, the request to edit including a modification of the data file and an identifier corresponding to the first entity;
   responsive to the request to edit, sending an edit request to a second entity for the data file, the edit request including the identifier corresponding to the first entity;
   receiving a confirmation message from the second entity with a signature; and
   signing a transaction data block corresponding to the request to edit with the signature received in the confirmation message.

2. The computer-implemented method of claim 1, where the modification to the data file in each of the one or more transaction data blocks comprises data describing a change to the data file and the method includes:
   receiving a request for the data file;
   responsive to the request for the data file, tracing the one or more transaction data blocks of the data file management blockchain back to the genesis block;
   generating a current version of the data file by applying the modification to the data file in each of the one or more transaction data blocks to the data file in the genesis block in a sequence determined by an order of the one or more transaction data blocks in the data file management blockchain; and
   returning the current version of the data file.

3. The computer-implemented method of claim 1, where the modification to the data file in each of the one or more transaction data blocks comprises a complete version of the data file including one or more modifications to the data file and the method includes:
   receiving a request for the data file;
   responsive to the request for the data file, identifying a most recent transaction data block of the one or more transaction data blocks of the data file management blockchain; and
   returning the version of the data file in the most recent transaction data block.

4. The computer-implemented method of claim 1, where each of the one or more transaction data blocks includes metadata identifying an entity corresponding to the data modification of the data file in the transaction data block.

5. The computer-implemented method of claim 1, where the data file in the genesis block and the modification to the data file in each of the one or more transaction data blocks are encrypted.

6. The computer-implemented method of claim 1, where each of the one or more transaction data blocks includes metadata identifying entities that are authorized to perform at least one of edit the data file or access the data file.

7. A system for data file management, the system comprising:
   one or more processors; and
   one or more memory devices in communication with the one or more processors, the memory devices having computer-readable instructions stored thereupon that, when executed by the processors, cause the processors to:
   generate a genesis block for a data file management blockchain, the genesis block including a data file to be managed;
   sign the genesis block to commit the genesis block to the data file management blockchain;
   generate one or more transaction data blocks for the data file management blockchain, each transaction data block including a modification to the data file;
   sign each of the one or more transaction data blocks to commit each of the one or more transaction data blocks to the data file management blockchain;
   receive a request to edit the data file from a first entity, the request to edit including a modification of the data file and an identifier corresponding to the first entity;
   responsive to the request to edit, send an edit request to a second entity for the data file, the edit request including the identifier corresponding to the first entity;

receive a confirmation message from the second entity with a signature; and sign a transaction data block corresponding to the request to edit with the signature received in the confirmation message.

8. The system of claim 7, where the modification to the data file in each of the one or more transaction data blocks comprises data describing a change to the data file and the memory devices include computer-readable instructions that, when executed by the processors, cause the processors to:

receive a request for the data file;

responsive to the request for the data file, trace the one or more transaction data blocks of the data file management blockchain back to the genesis block;

generate a current version of the data file by applying the modification to the data file in each of the one or more transaction data blocks to the data file in the genesis block in a sequence determined by an order of the one or more transaction data blocks in the data file management blockchain; and return the current version of the data file.

9. The system of claim 7, where the modification to the data file in each of the one or more transaction data blocks comprises a complete version of the data file including one or more modifications to the data file and the memory devices include computer-readable instructions that, when executed by the processors, cause the processors to:

receive a request for the data file;

responsive to the request for the data file, identify a most recent transaction data block of the one or more transaction data blocks of the data file management blockchain; and return the version of the data file in the most recent transaction data block.

10. The system of claim 7, where each of the one or more transaction data blocks includes metadata identifying an entity corresponding to the data modification of the data file in the transaction data block.

11. The system of claim 7, where the data file in the genesis block and the modification to the data file in each of the one or more transaction data blocks are encrypted.

12. The system of claim 7, where each of the one or more transaction data blocks includes metadata identifying entities that are authorized to perform at least one of edit the data file or access the data file.

13. A computer storage medium having computer executable instructions stored thereon which, when executed by one or more processors, cause the processors to execute a data file management method comprising:

generating a genesis block for a data file management blockchain, the genesis block including a data file to be managed;

signing the genesis block to commit the genesis block to the data file management blockchain;

generating one or more transaction data blocks for the data file management blockchain, each transaction data block including a modification to the data file;

signing each of the one or more transaction data blocks to commit each of the one or more transaction data blocks to the data file management blockchain;

receiving a request to edit the data file from a first entity, the request to edit including a modification of the data file and an identifier corresponding to the first entity;

responsive to the request to edit, sending an edit request to a second entity for the data file, the edit request including the identifier corresponding to the first entity;

receiving a confirmation message from the second entity with a signature; and signing a transaction data block corresponding to the request to edit with the signature received in the confirmation message.

14. The computer storage medium of claim 13, where the modification to the data file in each of the one or more transaction data blocks comprises data describing a change to the data file and the method includes:

receiving a request for the data file;

responsive to the request for the data file, tracing the one or more transaction data blocks of the data file management blockchain back to the genesis block;

generating a current version of the data file by applying the modification to the data file in each of the one or more transaction data blocks to the data file in the genesis block in a sequence determined by an order of the one or more transaction data blocks in the data file management blockchain; and returning the current version of the data file.

15. The computer storage medium of claim 13, where the modification to the data file in each of the one or more transaction data blocks comprises a complete version of the data file including one or more modifications to the data file and the method includes:

receiving a request for the data file;

responsive to the request for the data file, identifying a most recent transaction data block of the one or more transaction data blocks of the data file management blockchain; and returning the version of the data file in the most recent transaction data block.

16. The computer storage medium of claim 13, where each of the one or more transaction data blocks includes metadata identifying an entity corresponding to the data modification of the data file in the transaction data block.

17. The computer storage medium of claim 13, where the data file in the genesis block and the modification to the data file in each of the one or more transaction data blocks are encrypted.

* * * * *